US010564615B2

(12) United States Patent
Amundson et al.

(10) Patent No.: US 10,564,615 B2
(45) Date of Patent: Feb. 18, 2020

(54) BUILDING MANAGEMENT SYSTEM WITH DYNAMIC POINT LIST

(71) Applicant: Johnson Controls Technology Company, Plymouth, MI (US)

(72) Inventors: Christopher R. Amundson, Grafton, WI (US); David A. Kondrad, York Haven, PA (US); Kraig D. Ritmanich, Brookfield, WI (US); Aron M. Seiler, White Hall, MD (US); Jameel Ahmed, Milwaukee, WI (US); Curtis C. Crane, York, PA (US); Vivek V. Gupta, Shorewood, WI (US); Daniel F. Leising, New Berlin, WI (US); Brandon A. Sloat, New Berlin, WI (US); Lisa E. Strand, Wauwatosa, WI (US)

(73) Assignee: Johnson Controls Technology Company, Auburn Hills, MI (US)

( * ) Notice: Subject to any disclaimer, the term of this patent is extended or adjusted under 35 U.S.C. 154(b) by 374 days.

(21) Appl. No.: 15/424,593

(22) Filed: Feb. 3, 2017

(65) Prior Publication Data

US 2018/0101157 A1    Apr. 12, 2018

Related U.S. Application Data

(60) Provisional application No. 62/406,336, filed on Oct. 10, 2016.

(51) Int. Cl.
*G05B 15/02* (2006.01)
*H04L 12/28* (2006.01)
(Continued)

(52) U.S. Cl.
CPC .......... *G05B 15/02* (2013.01); *H04L 12/2803* (2013.01); *H04L 12/2807* (2013.01);
(Continued)

(58) Field of Classification Search
None
See application file for complete search history.

(56) References Cited

U.S. PATENT DOCUMENTS 6,487,457 B1 *  11/2002  Hull ....................... G05B 15/02
                                                                 700/17
8,055,387 B2    11/2011  Mccoy et al.
(Continued)

FOREIGN PATENT DOCUMENTS

KR    10-2015-0005770    1/2015

OTHER PUBLICATIONS

International Search Report and Written Opinion for PCT application No. PCT/US2016/037060, dated Oct. 19, 2016, 11 pages.

*Primary Examiner* — Qing Yuan Wu
(74) *Attorney, Agent, or Firm* — Foley & Lardner LLP

(57) ABSTRACT

An equipment controller in a building management system (BMS) includes a feature detector and a dynamic point list generator. The feature detector is configured to receive sensor input from a sensor and determine a set of features available to the equipment controller based on the sensor input. The dynamic point list generator is configured to determine unavailable features based on the set of available features and identify one or more points in a complete point list associated with the set of unavailable features. The dynamic point list generator is configured to generate a dynamic point list by removing the identified points from the complete point list and expose the dynamic point list to a BMS controller communicably connected to the equipment controller.

20 Claims, 9 Drawing Sheets

(51) Int. Cl.
*H04L 29/08* (2006.01)
*H04W 8/00* (2009.01)
*H04W 4/33* (2018.01)
*H04W 4/38* (2018.01)

(52) U.S. Cl.
CPC ...... *H04L 12/2809* (2013.01); *H04L 12/2816* (2013.01); *H04L 29/08648* (2013.01); *G05B 2219/163* (2013.01); *G05B 2219/25011* (2013.01); *G05B 2219/25168* (2013.01); *G05B 2219/2614* (2013.01); *G05B 2219/2642* (2013.01); *H04W 4/33* (2018.02); *H04W 4/38* (2018.02); *H04W 8/005* (2013.01)

(56) References Cited

U.S. PATENT DOCUMENTS

| | | |
|---|---|---|
| 2012/0109383 A1 | 5/2012 | Richards et al. |
| 2012/0215759 A1 | 8/2012 | Mccoy et al. |
| 2014/0018940 A1 | 1/2014 | Casilli |
| 2014/0343886 A1 | 11/2014 | Berinato et al. |
| 2015/0293508 A1* | 10/2015 | Piaskowski ............ G05B 15/02 700/275 |
| 2016/0366010 A1 | 12/2016 | Hamber et al. |

\* cited by examiner

BUILDING MANAGEMENT SYSTEM WITH DYNAMIC POINT LIST

CROSS-REFERENCE TO RELATED APPLICATIONS

This application claims the benefit of and priority to U.S. Provisional Patent Application No. 62/406,336 filed Oct. 10, 2016, the entirety of which is incorporated by reference herein.

BACKGROUND

The present disclosure relates generally to the field of heating, ventilation, and air conditioning (HVAC) systems. The present disclosure relates more particularly to systems and methods for adding an equipment controller to a building automation system (BMS).

HVAC systems typically include a plurality of HVAC equipment (e.g., chillers, boilers, air handling units, variable air volume units, etc.). An HVAC equipment typically employs an equipment controller to allow a user device to interact with and control the HVAC equipment. A BMS can be implemented to automatically monitor and control various HVAC equipment by communicating with equipment controllers associated with the HVAC equipment. For example, a BMS may be used to monitor and control temperature, humidity, air flow, air quality, and/or other conditions within a building or equipment.

Adding a new HVAC equipment controller to a BMS typically includes mapping all of the data points associated with the controller, which may exceed two-hundred for complex HVAC equipment. Some BMS are capable of automatically discovering and importing all data points found on the equipment controller. However, a human operator is often needed to manually determine which data points are relevant and reduce the list accordingly. It can be difficult and time-consuming to manually select relevant points to expose to a BMS.

SUMMARY

One implementation of the present disclosure is an equipment controller in a BMS. The equipment controller includes a feature detector and a dynamic point list generator. The feature detector is configured to receive sensor input from a sensor and determine a set of features available to the equipment controller based on the sensor input. The dynamic point list generator is configured to determine unavailable features based on the set of available features, identify one or more points in a complete point list associated with the set of unavailable features, generate a dynamic point list by removing the identified points from the complete point list, and expose the dynamic point list to a BMS controller communicably connected to the equipment controller.

In some embodiments, the equipment controller includes a user interface generator and a user selection detector. The user interface generator is configured to provide a user interface to a user device and receive user input from the user device via the user interface. The user selection detector configured to determine based on the user input a set of selected applications. The dynamic point list generator is configured to determine based on the set of selected applications a set of unselected applications, identify in the dynamic point list one or more points associated with the set of unselected applications, and remove from the dynamic point list the identified points associated with the set of unselected applications.

In some embodiments, the equipment controller includes a data reliability estimator configured to receive the sensor input from the feature detector and calculate a reliability confidence level of data within the sensor input. The dynamic point list generator is configured to determine whether the reliability confidence level exceeds a reliability threshold, and in response to a determination that the reliability confidence level exceeds the reliability threshold, identify one or more points associated with the sensor data and remove the identified points from the dynamic point list.

In some embodiments, the equipment controller includes a historical data database and the dynamic point list generator is configured to calculate the reliability confidence level by comparing the data within the sensor input to data stored in the historical data database.

In some embodiments, the equipment controller includes an applications module configured to detect a second set of applications based on input from the BMS controller. The dynamic point list generator is configured to determine based on the second set of applications a second set of unselected applications, identify in the dynamic point list one or more points associated with the second set of unselected applications, and remove from the dynamic point list the identified points associated with the second set of unselected applications.

In some embodiments, the equipment controller includes an applications module configured to receive a set of applications based on input from the BMS controller and provide the set of applications to the dynamic point list generator 730. The dynamic point list generator is configured to determine based on the set of applications a set of unselected applications, identify in the dynamic point list one or more points associated with the set of unselected applications, and remove from the dynamic point list the identified points associated with the set of unselected applications.

Another implementation of the present disclosure is a method for dynamically adjusting points exposed by an equipment controller in a BMS. The method includes receiving at the equipment controller a sensor input from a sensor, detecting based on the sensor input a set of features available to the equipment controller, determining based on the set of available features a set of unavailable features, identifying in a complete point list one or more points associated with the set of unavailable features, generating a dynamic point list by removing the identified points from the complete point list, and exposing the dynamic point list to a BMS controller in the BMS.

In some embodiments, the method includes receiving a user input from a user device, detecting based on the user input a set of selected applications, determining based on the set of selected applications a set of unselected applications, identifying in the dynamic point list one or more points associated with the set of unselected applications, and removing from the dynamic point list the identified points associated with the set of unselected applications.

In some embodiments, the method includes providing a user interface to the user device, and receiving a selection via the user interface of a set of applications capable of being executed by the equipment controller.

In some embodiments, the method includes calculating a reliability confidence level of data provided in the sensor input, determining whether the reliability confidence level exceeds a reliability threshold, and in response to a determination that the reliability confidence level exceeds the reliability threshold identifying one or more points in the dynamic point list associated with the data provided in the sensor input and removing the identified points from the dynamic point list.

In some embodiments, the method includes calculating the confidence level by comparing the data provided in the sensor input to data stored in a historical data database.

In some embodiments, the method includes receiving a BMS input from the BMS controller, detecting based on the BMS input a second set of applications, determining based on the second set of applications a second set of unselected applications, identifying in the dynamic point list one or more points associated with the second set of unselected applications, and removing from the dynamic point list the identified points associated with the second set of unselected applications.

In some embodiments, the method includes receiving a BMS input from the BMS controller, detecting based on the BMS input a set of selected applications, determining based on the set of selected applications a set of unselected applications, identifying in the dynamic point list one or more points associated with the set of unselected applications, and removing from the dynamic point list the identified points associated with the set of unselected applications.

Another implementation of the present disclosure is an equipment controller in a BMS. The equipment controller includes a feature detector and a dynamic point list generator. The feature detector is configured to receive sensor input from a sensor and determine a set of features available to the equipment controller based on the sensor input. The dynamic point list generator configured to identify one or more points associated with the set of available features, generate a dynamic point list comprising the identified points, and expose the dynamic point list to a BMS controller in the BMS communicably connected to the equipment controller.

In some embodiments, the equipment controller includes a user interface generator and a user selection detector. The user interface generator is configured to provide a user interface to a user device and receive user input from the user device via the user interface. The user selection detector is configured to determine, based on user input, a set of selected applications. The dynamic point list generator is configured to identify one or more points associated with the set of selected applications, and generate the dynamic point list comprising the identified points.

In some embodiments, the equipment controller includes a data reliability estimator configured to receive the sensor input from the feature detector and calculate a reliability confidence level of data within the sensor input. The dynamic point list generator is configured to determine whether the reliability confidence level exceeds a reliability threshold, and in response to a determination that the reliability confidence level exceeds the reliability threshold, identify one or more points associated with the sensor data and generate the dynamic point list comprising the identified points.

In some embodiments, the equipment controller includes a historical data database and the dynamic point list generator is configured to calculate the reliability confidence level by comparing the data within the sensor input to data stored in the historical data database.

In some embodiments, the equipment controller includes an applications module configured to detect a second set of selected applications based on input from the BMS controller. The dynamic point list generator is configured to identify one or more points associated with the set of selected applications, and generate the dynamic point list comprising the identified points.

In some embodiments, the equipment controller includes an applications module configured to detect a set of selected applications based on input from the BMS controller. The dynamic point list generator is configured to identify one or more points associated with the set of selected applications, and generate the dynamic point list comprising the identified points.

Those skilled in the art will appreciate that the summary is illustrative only and is not intended to be in any way limiting. Other aspects, inventive features, and advantages of the devices and/or processes described herein, as defined solely by the claims, will become apparent in the detailed description set forth herein and taken in conjunction with the accompanying drawings.

BRIEF DESCRIPTION OF THE DRAWINGS

Some embodiments will become more fully understood from the following detailed description, taken in conjunction with the accompanying drawings, wherein like reference numerals refer to like elements, in which.

DETAILED DESCRIPTION

Overview

Referring generally to the FIGURES, a building management system (BMS) with dynamic point list generation and components thereof are shown according to various exemplary embodiments. The BMS generally includes an HVAC system with one or more HVAC equipment. HVAC equipment includes an equipment controller with a dynamic point list generator configured to generate the dynamic point list.

In traditional BMS architecture, when a new HVAC equipment is added to the HVAC system, the BMS can facilitate automatic discovery of the HVAC equipment and automatic mapping of data points. This involves mapping of a complete data point list, even though some data points may be irrelevant. In particular, irrelevant data points may include data points associated with features not provided with the HVAC equipment or data points associated with applications not selected by the user device or BMS controller. Irrelevant data points are, in general, manually removed.

Dynamic point list generator can provide BMS controller with a dynamic point list, which generally represents a subset of the complete data point list. The dynamic point list contains data points that are exposed to the BMS and thus those data points can be imported and mapped by the BMS. Data points that are not exposed to the BMS cannot be auto-discovered or mapped by the BMS.

Dynamic point list generator is generally configured to generate the dynamic point list using sensor input from sensors and/or input information from a user device. A feature detector provided with the equipment controller can identify features available to an associated HVAC equipment. A user selection detector provided with the equipment controller can identify user-selected applications for an associated HVAC equipment. Dynamic point list generator can generate the dynamic point list by identifying data points in a complete data point list associated with the detected features and selected applications. Additional features and advantages of the HVAC system are described in detail below.

Building HVAC Systems and Building Management Systems

Figure 1:
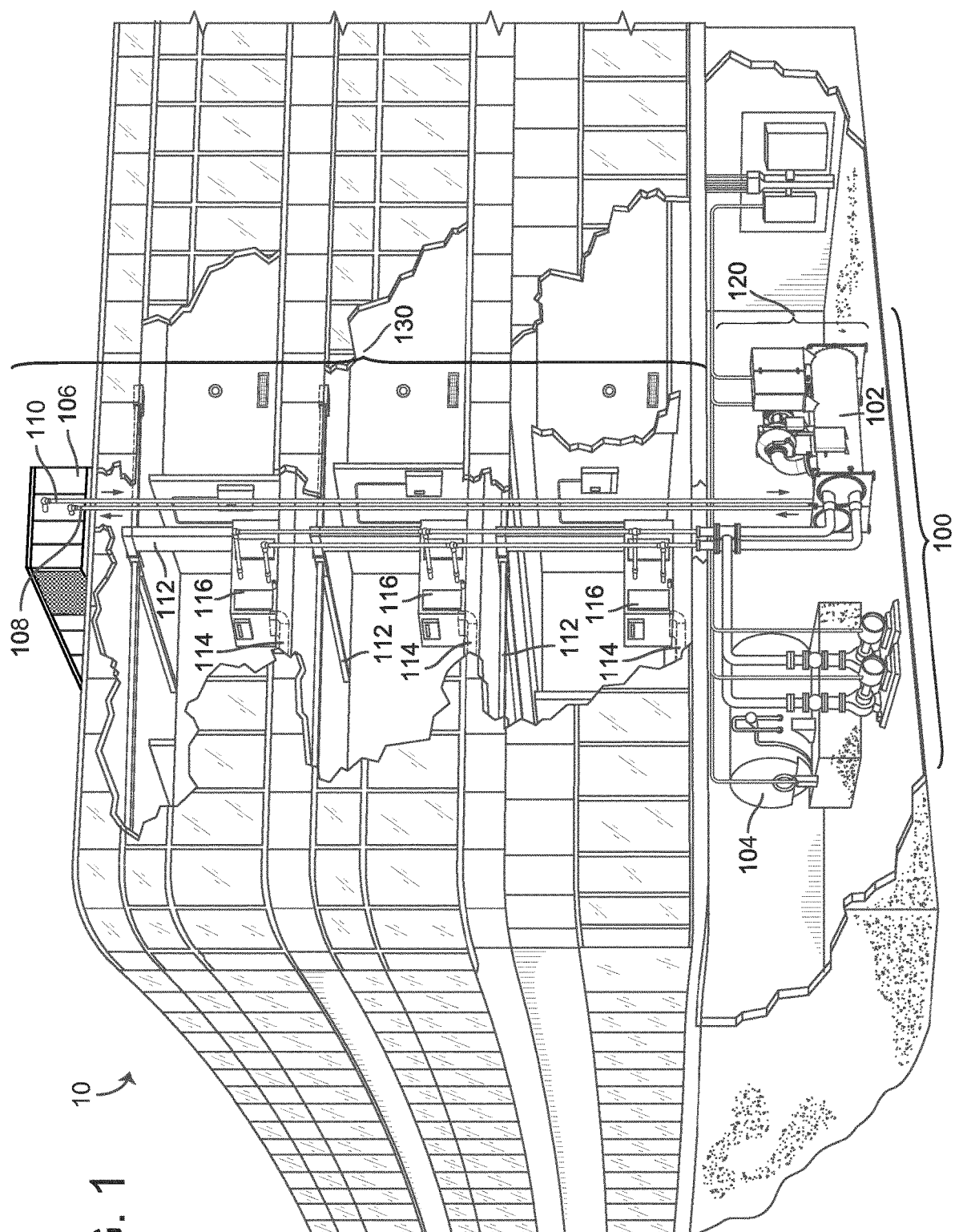
FIG. 1 is a drawing of a building equipped with a heating, ventilation, or air conditioning (HVAC) system, according to an exemplary embodiment.
Figure 2:
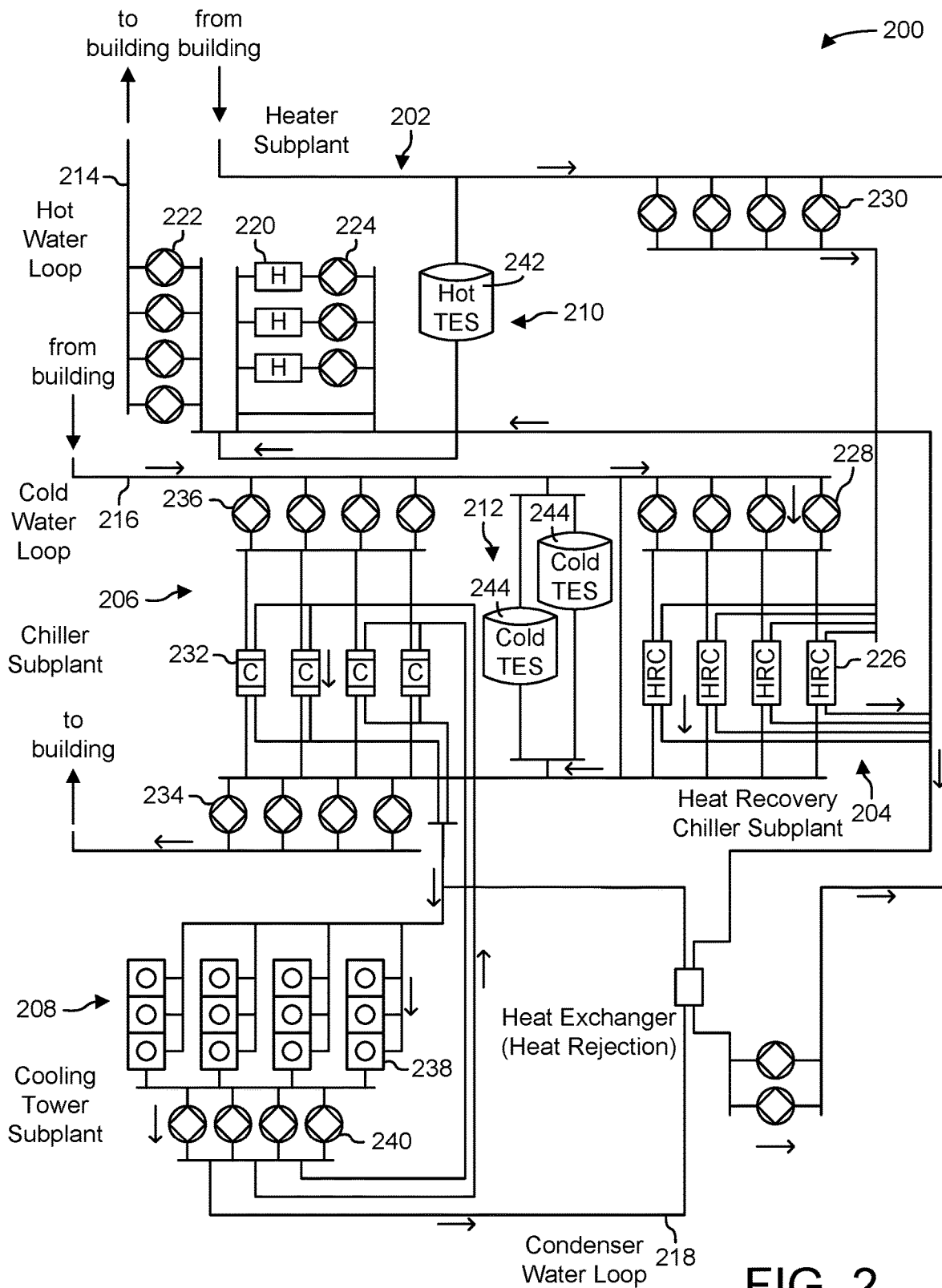
FIG. 2 is a drawing of a waterside system which can be used in combination with the HVAC system of FIG. 1, according to an exemplary embodiment.
Figure 3:
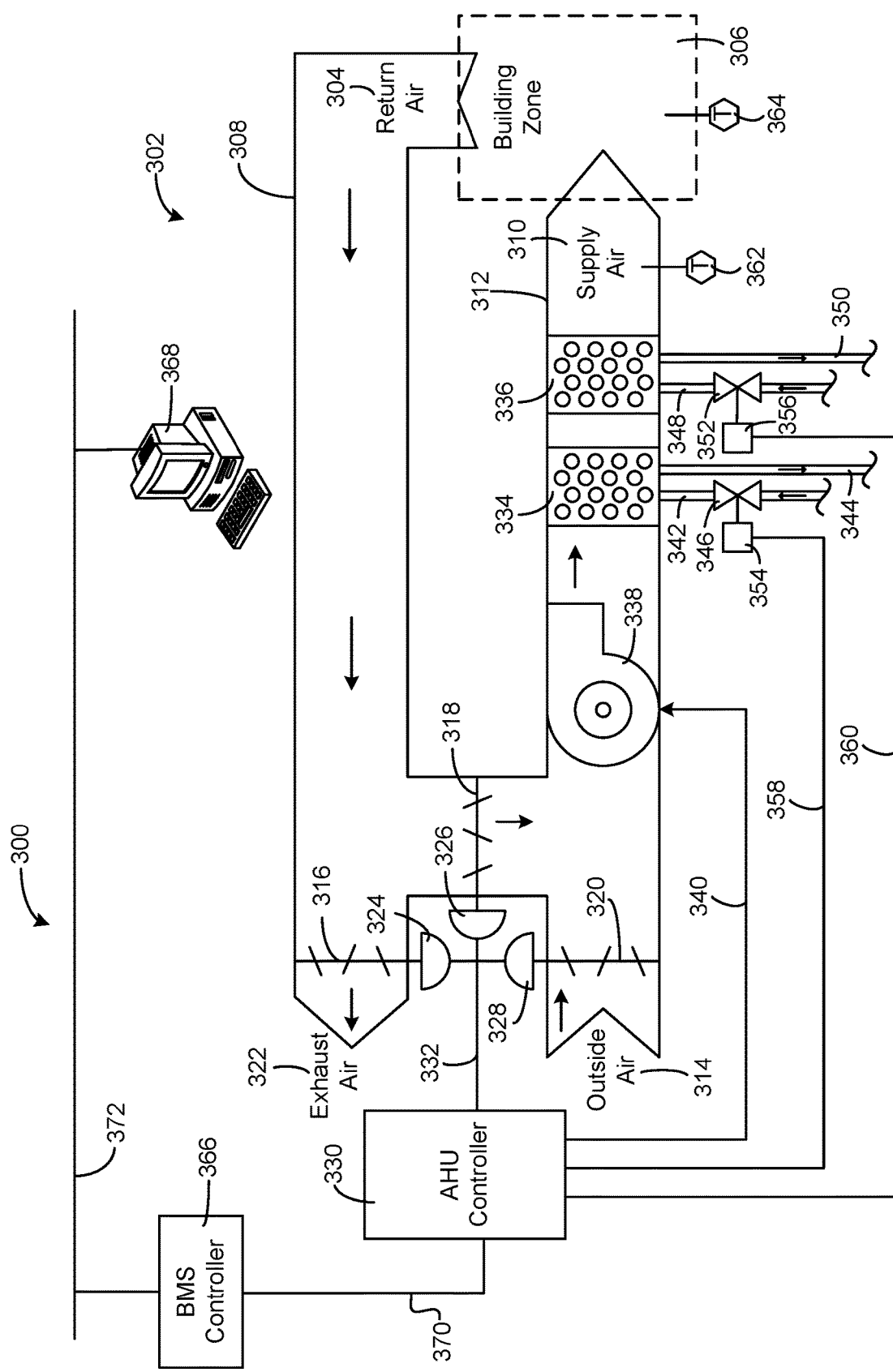
FIG. 3 is a drawing of an airside system which can be used in combination with the HVAC system of FIG. 1, according to an exemplary embodiment.
Figure 4:
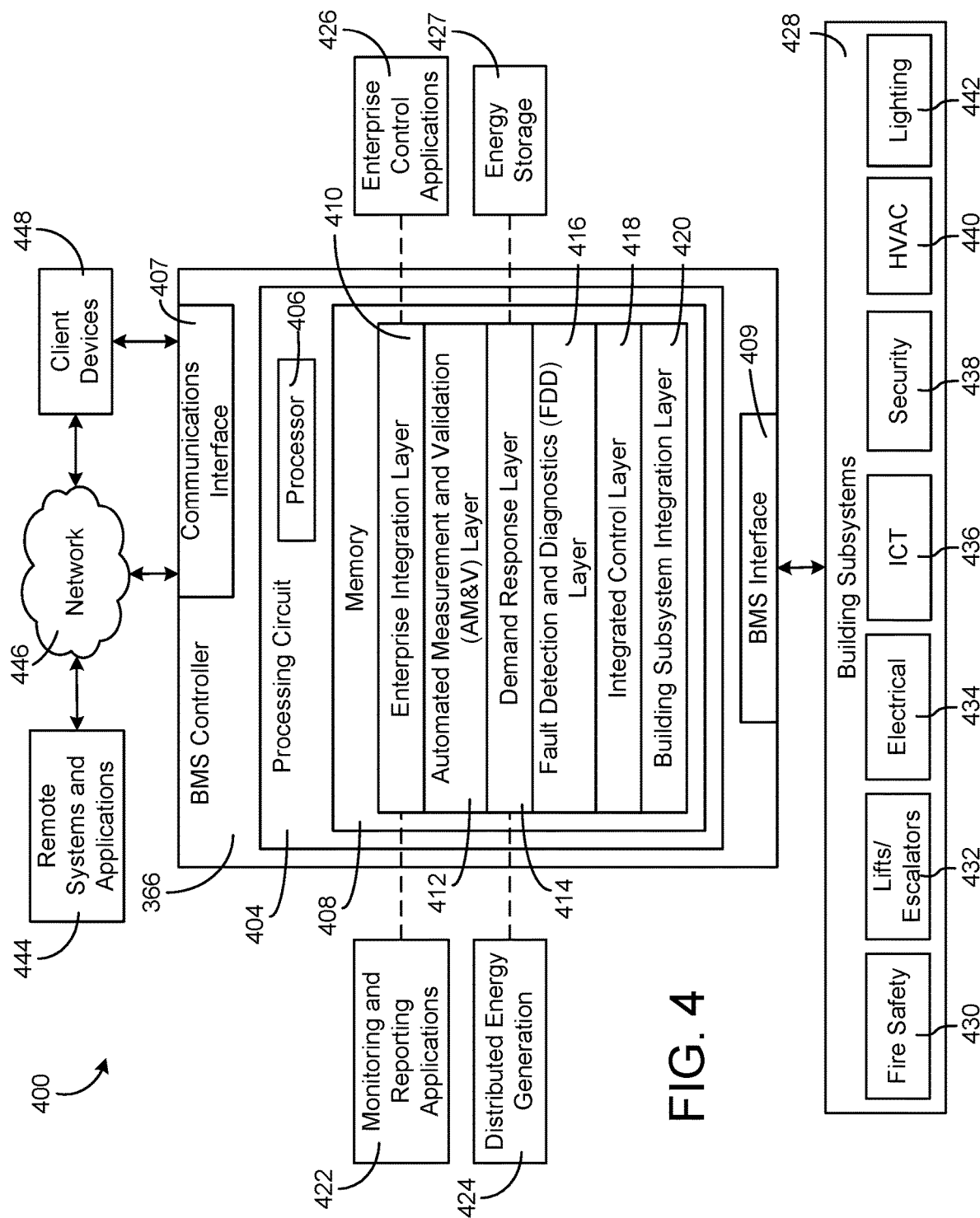
FIG. 4 is a block diagram of a building management system which can be used to monitor and control the building and HVAC system of FIG. 1, according to an exemplary embodiment.
Figure 5:
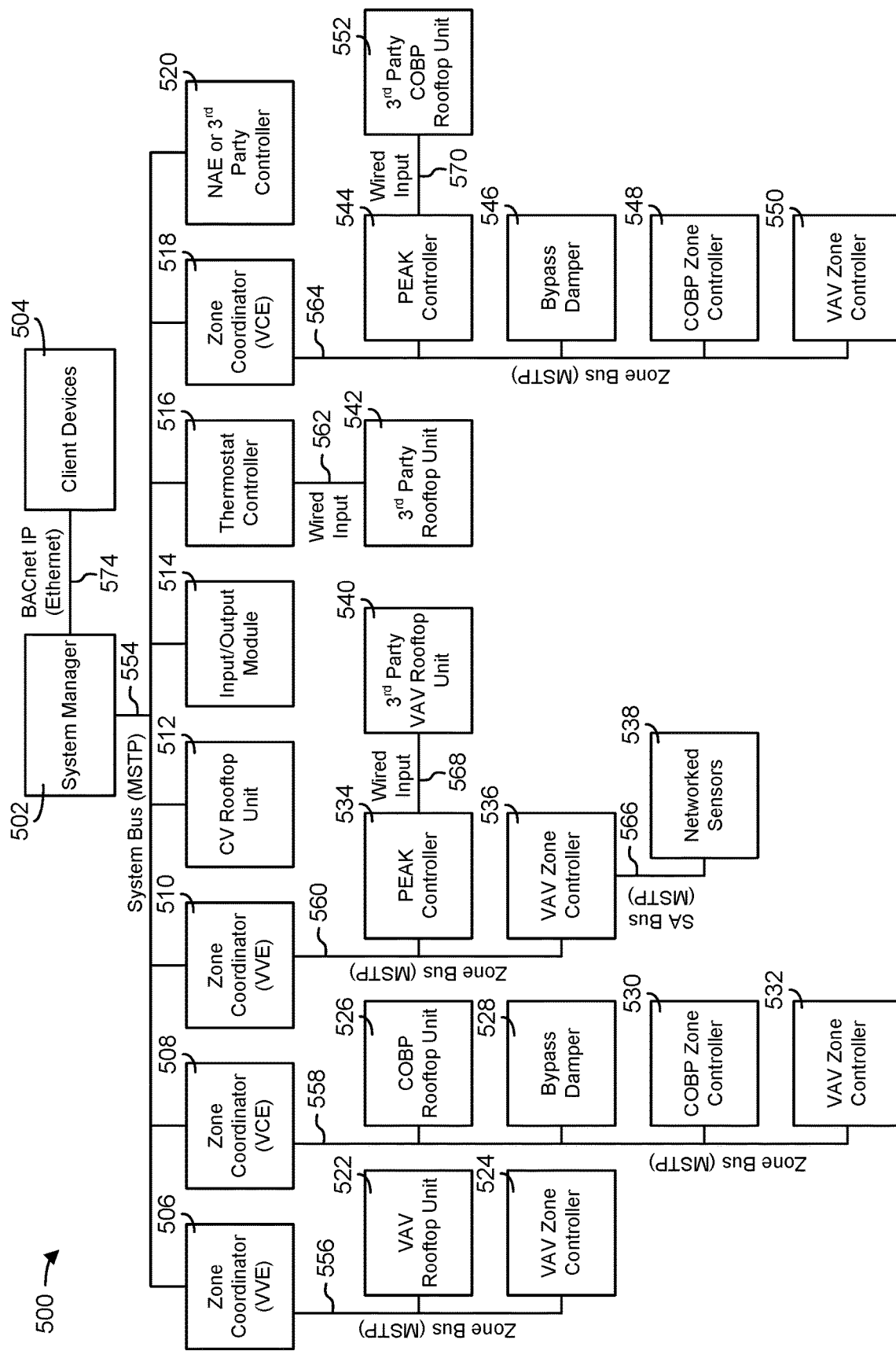
FIG. 5 is a block diagram of another building management system which can be used to monitor and control the building and HVAC system of FIG. 1, according to an exemplary embodiment.

Referring now to FIGS. 1-5, BMS and HVAC systems in which the systems and methods of the present disclosure can be implemented are shown, according to some embodiments. In brief overview, FIG. 1 shows a building 10 equipped with a HVAC system 100. FIG. 2 is a block diagram of a waterside system 200 which can be used to serve building 10. FIG. 3 is a block diagram of an airside system 300 which can be used to serve building 10. FIG. 4 is a block diagram of a BMS which can be used to monitor and control building 10. FIG. 5 is a block diagram of another BMS which can be used to monitor and control building 10.

Building and HVAC System

Referring particularly to FIG. 1, a perspective view of a building 10 is shown. Building 10 is served by a BMS. A BMS is, in general, a system of devices configured to control, monitor, and manage equipment in or around a building or building area. A BMS can include, for example, a HVAC system, a security system, a lighting system, a fire alerting system, any other system that is capable of managing building functions or devices, or any combination thereof.

The BMS that serves building 10 includes a HVAC system 100. HVAC system 100 can include a plurality of HVAC devices (e.g., heaters, chillers, air handling units, pumps, fans, thermal energy storage, etc.) configured to provide heating, cooling, ventilation, or other services for building 10. For example, HVAC system 100 is shown to include a waterside system 120 and an airside system 130. Waterside system 120 may provide a heated or chilled fluid to an air handling unit of airside system 130. Airside system 130 may use the heated or chilled fluid to heat or cool an airflow provided to building 10. An exemplary waterside system and airside system which can be used in HVAC system 100 are described in greater detail with reference to FIGS. 2-3.

HVAC system 100 is shown to include a chiller 102, a boiler 104, and a rooftop air handling unit (AHU) 106. Waterside system 120 may use boiler 104 and chiller 102 to heat or cool a working fluid (e.g., water, glycol, etc.) and may circulate the working fluid to AHU 106. In various embodiments, the HVAC devices of waterside system 120 can be located in or around building 10 (as shown in FIG. 1) or at an offsite location such as a central plant (e.g., a chiller plant, a steam plant, a heat plant, etc.). The working fluid can be heated in boiler 104 or cooled in chiller 102, depending on whether heating or cooling is required in building 10. Boiler 104 may add heat to the circulated fluid, for example, by burning a combustible material (e.g., natural gas) or using an electric heating element. Chiller 102 may place the circulated fluid in a heat exchange relationship with another fluid (e.g., a refrigerant) in a heat exchanger (e.g., an evaporator) to absorb heat from the circulated fluid. The working fluid from chiller 102 and/or boiler 104 can be transported to AHU 106 via piping 108.

In some embodiments, HVAC system 100 uses free cooling to cool the working fluid. For example, HVAC system 100 can include one or more cooling towers or heat exchangers which transfer heat from the working fluid to outside air. Free cooling can be used as an alternative or supplement to mechanical cooling via chiller 102 when the temperature of the outside air is below a threshold temperature. HVAC system 100 can switch between free cooling and mechanical cooling based on the current temperature of the outside air and/or the predicted future temperature of the outside air. An example of a free cooling system which can be used in HVAC system 100 is described in greater detail with reference to FIG. 6.

AHU 106 may place the working fluid in a heat exchange relationship with an airflow passing through AHU 106 (e.g., via one or more stages of cooling coils and/or heating coils). The airflow can be, for example, outside air, return air from within building 10, or a combination of both. AHU 106 may transfer heat between the airflow and the working fluid to provide heating or cooling for the airflow. For example, AHU 106 can include one or more fans or blowers configured to pass the airflow over or through a heat exchanger containing the working fluid. The working fluid may then return to chiller 102 or boiler 104 via piping 110.

Airside system 130 may deliver the airflow supplied by AHU 106 (i.e., the supply airflow) to building 10 via air supply ducts 112 and may provide return air from building 10 to AHU 106 via air return ducts 114. In some embodiments, airside system 130 includes multiple variable air volume (VAV) units 116. For example, airside system 130 is shown to include a separate VAV unit 116 on each floor or zone of building 10. VAV units 116 can include dampers or other flow control elements that can be operated to control an amount of the supply airflow provided to individual zones of building 10. In other embodiments, airside system 130 delivers the supply airflow into one or more zones of building 10 (e.g., via supply ducts 112) without using intermediate VAV units 116 or other flow control elements. AHU 106 can include various sensors (e.g., temperature sensors, pressure sensors, etc.) configured to measure attributes of the supply airflow. AHU 106 may receive input from sensors located within AHU 106 and/or within the building zone and may adjust the flow rate, temperature, or other attributes of the supply airflow through AHU 106 to achieve setpoint conditions for the building zone.

Waterside System

Referring now to FIG. 2, a block diagram of a waterside system 200 is shown, according to some embodiments. In various embodiments, waterside system 200 may supplement or replace waterside system 120 in HVAC system 100 or can be implemented separate from HVAC system 100. When implemented in HVAC system 100, waterside system 200 can include a subset of the HVAC devices in HVAC system 100 (e.g., boiler 104, chiller 102, pumps, valves, etc.) and may operate to supply a heated or chilled fluid to AHU 106. The HVAC devices of waterside system 200 can be located within building 10 (e.g., as components of waterside system 120) or at an offsite location such as a central plant.

In FIG. 2, waterside system 200 is shown as a central plant having a plurality of subplants 202-212. Subplants 202-212 are shown to include a heater subplant 202, a heat recovery chiller subplant 204, a chiller subplant 206, a cooling tower subplant 208, a hot thermal energy storage (TES) subplant 210, and a cold thermal energy storage (TES) subplant 212. Subplants 202-212 consume resources (e.g., water, natural gas, electricity, etc.) from utilities to serve thermal energy loads (e.g., hot water, cold water, heating, cooling, etc.) of a building or campus. For example, heater subplant 202 can be configured to heat water in a hot water loop 214 that circulates the hot water between heater subplant 202 and building 10. Chiller subplant 206 can be configured to chill water in a cold water loop 216 that circulates the cold water between chiller subplant 206 building 10. Heat recovery chiller subplant 204 can be configured to transfer heat from cold water loop 216 to hot water loop 214 to provide additional heating for the hot water and additional cooling for the cold water. Condenser water loop 218 may absorb heat from the cold water in chiller subplant 206 and reject the absorbed heat in cooling tower subplant 208 or transfer the absorbed heat to hot water loop 214. Hot TES subplant 210 and cold TES subplant 212 may store hot and cold thermal energy, respectively, for subsequent use.

Hot water loop 214 and cold water loop 216 may deliver the heated and/or chilled water to air handlers located on the rooftop of building 10 (e.g., AHU 106) or to individual floors or zones of building 10 (e.g., VAV units 116). The air handlers push air past heat exchangers (e.g., heating coils or cooling coils) through which the water flows to provide heating or cooling for the air. The heated or cooled air can be delivered to individual zones of building 10 to serve thermal energy loads of building 10. The water then returns to subplants 202-212 to receive further heating or cooling.

Although subplants 202-212 are shown and described as heating and cooling water for circulation to a building, it is understood that any other type of working fluid (e.g., glycol, CO2, etc.) can be used in place of or in addition to water to serve thermal energy loads. In other embodiments, subplants 202-212 may provide heating and/or cooling directly to the building or campus without requiring an intermediate heat transfer fluid. These and other variations to waterside system 200 are within the teachings of the present disclosure.

Each of subplants 202-212 can include a variety of equipment configured to facilitate the functions of the subplant. For example, heater subplant 202 is shown to include a plurality of heating elements 220 (e.g., boilers, electric heaters, etc.) configured to add heat to the hot water in hot water loop 214. Heater subplant 202 is also shown to include several pumps 222 and 224 configured to circulate the hot water in hot water loop 214 and to control the flow rate of the hot water through individual heating elements 220. Chiller subplant 206 is shown to include a plurality of chillers 232 configured to remove heat from the cold water in cold water loop 216. Chiller subplant 206 is also shown to include several pumps 234 and 236 configured to circulate the cold water in cold water loop 216 and to control the flow rate of the cold water through individual chillers 232.

Heat recovery chiller subplant 204 is shown to include a plurality of heat recovery heat exchangers 226 (e.g., refrigeration circuits) configured to transfer heat from cold water loop 216 to hot water loop 214. Heat recovery chiller subplant 204 is also shown to include several pumps 228 and 230 configured to circulate the hot water and/or cold water through heat recovery heat exchangers 226 and to control the flow rate of the water through individual heat recovery heat exchangers 226. Cooling tower subplant 208 is shown to include a plurality of cooling towers 238 configured to remove heat from the condenser water in condenser water loop 218. Cooling tower subplant 208 is also shown to include several pumps 240 configured to circulate the condenser water in condenser water loop 218 and to control the flow rate of the condenser water through individual cooling towers 238.

In some embodiments, waterside system 200 uses free cooling to cool the water in cold water loop 216. For example, the water returning from the building in cold water loop 216 can be delivered to cooling tower subplant 208 and through cooling towers 238. Cooling towers 238 can remove heat from the water in cold water loop 216 (e.g., by transferring the heat to outside air) to provide free cooling for the water in cold water loop 216. In some embodiments, waterside system 200 switches between free cooling with cooling tower subplant 208 and mechanical cooling with chiller subplant 208 based on the current temperature of the outside air and/or the predicted future temperature of the outside air. An example of a free cooling system which can be used in waterside system 200 is described in greater detail with reference to FIG. 6.

Hot TES subplant 210 is shown to include a hot TES tank 242 configured to store the hot water for later use. Hot TES subplant 210 may also include one or more pumps or valves configured to control the flow rate of the hot water into or out of hot TES tank 242. Cold TES subplant 212 is shown to include cold TES tanks 244 configured to store the cold water for later use. Cold TES subplant 212 may also include one or more pumps or valves configured to control the flow rate of the cold water into or out of cold TES tanks 244.

In some embodiments, one or more of the pumps in waterside system 200 (e.g., pumps 222, 224, 228, 230, 234, 236, and/or 240) or pipelines in waterside system 200 include an isolation valve associated therewith. Isolation valves can be integrated with the pumps or positioned upstream or downstream of the pumps to control the fluid flows in waterside system 200. In various embodiments, waterside system 200 can include more, fewer, or different types of devices and/or subplants based on the particular configuration of waterside system 200 and the types of loads served by waterside system 200.

Airside System

Referring now to FIG. 3, a block diagram of an airside system 300 is shown, according to some embodiments. In various embodiments, airside system 300 may supplement or replace airside system 130 in HVAC system 100 or can be implemented separate from HVAC system 100. When implemented in HVAC system 100, airside system 300 can include a subset of the HVAC devices in HVAC system 100 (e.g., AHU 106, VAV units 116, ducts 112-114, fans, dampers, etc.) and can be located in or around building 10. Airside system 300 may operate to heat or cool an airflow provided to building 10 using a heated or chilled fluid provided by waterside system 200.

In FIG. 3, airside system 300 is shown to include an economizer-type air handling unit (AHU) 302. Economizer-type AHUs vary the amount of outside air and return air used by the air handling unit for heating or cooling. For example, AHU 302 may receive return air 304 from building zone 306 via return air duct 308 and may deliver supply air 310 to building zone 306 via supply air duct 312. In some embodiments, AHU 302 is a rooftop unit located on the roof of building 10 (e.g., AHU 106 as shown in FIG. 1) or otherwise positioned to receive both return air 304 and outside air 314. AHU 302 can be configured to operate exhaust air damper 316, mixing damper 318, and outside air damper 320 to control an amount of outside air 314 and return air 304 that combine to form supply air 310. Any return air 304 that does not pass through mixing damper 318 can be exhausted from AHU 302 through exhaust damper 316 as exhaust air 322.

Each of dampers 316-320 can be operated by an actuator. For example, exhaust air damper 316 can be operated by actuator 324, mixing damper 318 can be operated by actuator 326, and outside air damper 320 can be operated by actuator 328. Actuators 324-328 may communicate with an AHU controller 330 via a communications link 332. Actuators 324-328 may receive control signals from AHU controller 330 and may provide feedback signals to AHU controller 330. Feedback signals can include, for example, an indication of a current actuator or damper position, an amount of torque or force exerted by the actuator, diagnostic information (e.g., results of diagnostic tests performed by actuators 324-328), status information, commissioning information, configuration settings, calibration data, and/or other types of information or data that can be collected, stored, or used by actuators 324-328. AHU controller 330 can be an economizer controller configured to use one or more control algorithms (e.g., state-based algorithms, extremum seeking control (ESC) algorithms, proportional-integral (PI) control algorithms, proportional-integral-derivative (PID) control algorithms, model predictive control (MPC) algorithms, feedback control algorithms, etc.) to control actuators 324-328.

Still referring to FIG. 3, AHU 302 is shown to include a cooling coil 334, a heating coil 336, and a fan 338 positioned within supply air duct 312. Fan 338 can be configured to force supply air 310 through cooling coil 334 and/or heating coil 336 and provide supply air 310 to building zone 306. AHU controller 330 may communicate with fan 338 via communications link 340 to control a flow rate of supply air 310. In some embodiments, AHU controller 330 controls an amount of heating or cooling applied to supply air 310 by modulating a speed of fan 338.

Cooling coil 334 may receive a chilled fluid from waterside system 200 (e.g., from cold water loop 216) via piping 342 and may return the chilled fluid to waterside system 200 via piping 344. Valve 346 can be positioned along piping 342 or piping 344 to control a flow rate of the chilled fluid through cooling coil 334. In some embodiments, cooling coil 334 includes multiple stages of cooling coils that can be independently activated and deactivated (e.g., by AHU controller 330, by BMS controller 366, etc.) to modulate an amount of cooling applied to supply air 310.

Heating coil 336 may receive a heated fluid from waterside system 200 (e.g., from hot water loop 214) via piping 348 and may return the heated fluid to waterside system 200 via piping 350. Valve 352 can be positioned along piping 348 or piping 350 to control a flow rate of the heated fluid through heating coil 336. In some embodiments, heating coil 336 includes multiple stages of heating coils that can be independently activated and deactivated (e.g., by AHU controller 330, by BMS controller 366, etc.) to modulate an amount of heating applied to supply air 310.

Each of valves 346 and 352 can be controlled by an actuator. For example, valve 346 can be controlled by actuator 354 and valve 352 can be controlled by actuator 356. Actuators 354-356 may communicate with AHU controller 330 via communications links 358-360. Actuators 354-356 may receive control signals from AHU controller 330 and may provide feedback signals to controller 330. In some embodiments, AHU controller 330 receives a measurement of the supply air temperature from a temperature sensor 362 positioned in supply air duct 312 (e.g., downstream of cooling coil 334 and/or heating coil 336). AHU controller 330 may also receive a measurement of the temperature of building zone 306 from a temperature sensor 364 located in building zone 306.

In some embodiments, AHU controller 330 operates valves 346 and 352 via actuators 354-356 to modulate an amount of heating or cooling provided to supply air 310 (e.g., to achieve a setpoint temperature for supply air 310 or to maintain the temperature of supply air 310 within a setpoint temperature range). The positions of valves 346 and 352 affect the amount of heating or cooling provided to supply air 310 by cooling coil 334 or heating coil 336 and may correlate with the amount of energy consumed to achieve a desired supply air temperature. AHU 330 may control the temperature of supply air 310 and/or building zone 306 by activating or deactivating coils 334-336, adjusting a speed of fan 338, or a combination of both.

In some embodiments, AHU controller 330 uses free cooling to cool supply air 310. AHU controller 330 can switch between free cooling and mechanical cooling by operating outside air damper 320 and cooling coil 334. For example, AHU controller 330 can deactivate cooling coil 334 and open outside air damper 320 to allow outside air 314 to enter supply air duct 312 in response to a determination that free cooling is economically optimal. AHU controller 330 can determine whether free cooling is economically optimal based on the temperature of outside air 314 and/or the predicted future temperature of outside air 314. For example, AHU controller 330 can determine whether the temperature of outside air 314 is predicted to be below a threshold temperature for a predetermined amount of time. An example of free cooling switching logic which can be used by AHU controller 330 is described in greater detail with reference to FIG. 10.

Still referring to FIG. 3, airside system 300 is shown to include a building management system (BMS) controller 366 and a client device 368. BMS controller 366 can include one or more computer systems (e.g., servers, supervisory controllers, subsystem controllers, etc.) that serve as system level controllers, application or data servers, head nodes, or master controllers for airside system 300, waterside system 200, HVAC system 100, and/or other controllable systems that serve building 10. BMS controller 366 may communicate with multiple downstream building systems or subsystems (e.g., HVAC system 100, a security system, a lighting system, waterside system 200, etc.) via a communications link 370 according to like or disparate protocols (e.g., LON, BACnet, etc.). In various embodiments, AHU controller 330 and BMS controller 366 can be separate (as shown in FIG. 3) or integrated. In an integrated implementation, AHU controller 330 can be a software module configured for execution by a processor of BMS controller 366.

In some embodiments, AHU controller 330 receives information from BMS controller 366 (e.g., commands, setpoints, operating boundaries, etc.) and provides information to BMS controller 366 (e.g., temperature measurements, valve or actuator positions, operating statuses, diagnostics, etc.). For example, AHU controller 330 may provide BMS controller 366 with temperature measurements from temperature sensors 362-364, equipment on/off states, equipment operating capacities, and/or any other information that can be used by BMS controller 366 to monitor or control a variable state or condition within building zone 306.

Client device 368 can include one or more human-machine interfaces or client interfaces (e.g., graphical user interfaces, reporting interfaces, text-based computer interfaces, client-facing web services, web servers that provide pages to web clients, etc.) for controlling, viewing, or otherwise interacting with HVAC system 100, its subsystems, and/or devices. Client device 368 can be a computer workstation, a client terminal, a remote or local interface, or any other type of user interface device. Client device 368 can be a stationary terminal or a mobile device. For example, client device 368 can be a desktop computer, a computer server with a user interface, a laptop computer, a tablet, a smartphone, a PDA, or any other type of mobile or non-mobile device. Client device 368 may communicate with BMS controller 366 and/or AHU controller 330 via communications link 372.

Building Management Systems

Referring now to FIG. 4, a block diagram of a building management system (BMS) 400 is shown, according to some embodiments. BMS 400 can be implemented in building 10 to automatically monitor and control various building functions. BMS 400 is shown to include BMS controller 366 and a plurality of building subsystems 428. Building subsystems 428 are shown to include a building electrical subsystem 434, an information communication technology (ICT) subsystem 436, a security subsystem 438, a HVAC subsystem 440, a lighting subsystem 442, a lift/escalators subsystem 432, and a fire safety subsystem 430. In various embodiments, building subsystems 428 can include fewer, additional, or alternative subsystems. For example, building subsystems 428 may also or alternatively include a refrigeration subsystem, an advertising or signage subsystem, a cooking subsystem, a vending subsystem, a printer or copy service subsystem, or any other type of building subsystem that uses controllable equipment and/or sensors to monitor or control building 10. In some embodiments, building subsystems 428 include waterside system 200 and/or airside system 300, as described with reference to FIGS. 2-3.

Each of building subsystems 428 can include any number of devices, controllers, and connections for completing its individual functions and control activities. HVAC subsystem 440 can include many of the same components as HVAC system 100, as described with reference to FIGS. 1-3. For example, HVAC subsystem 440 can include a chiller, a boiler, any number of air handling units, economizers, field controllers, supervisory controllers, actuators, temperature sensors, and other devices for controlling the temperature, humidity, airflow, or other variable conditions within building 10. Lighting subsystem 442 can include any number of light fixtures, ballasts, lighting sensors, dimmers, or other devices configured to controllably adjust the amount of light provided to a building space. Security subsystem 438 can include occupancy sensors, video surveillance cameras, digital video recorders, video processing servers, intrusion detection devices, access control devices and servers, or other security-related devices.

Still referring to FIG. 4, BMS controller 366 is shown to include a communications interface 407 and a BMS interface 409. Interface 407 may facilitate communications between BMS controller 366 and external applications (e.g., monitoring and reporting applications 422, enterprise control applications 426, remote systems and applications 444, applications residing on client devices 448, etc.) for allowing user control, monitoring, and adjustment to BMS controller 366 and/or subsystems 428. Interface 407 may also facilitate communications between BMS controller 366 and client devices 448. BMS interface 409 may facilitate communications between BMS controller 366 and building subsystems 428 (e.g., HVAC, lighting security, lifts, power distribution, business, etc.).

Interfaces 407, 409 can be or include wired or wireless communications interfaces (e.g., jacks, antennas, transmitters, receivers, transceivers, wire terminals, etc.) for conducting data communications with building subsystems 428 or other external systems or devices. In various embodiments, communications via interfaces 407, 409 can be direct (e.g., local wired or wireless communications) or via a communications network 446 (e.g., a WAN, the Internet, a cellular network, etc.). For example, interfaces 407, 409 can include an Ethernet card and port for sending and receiving data via an Ethernet-based communications link or network. In another example, interfaces 407, 409 can include a Wi-Fi transceiver for communicating via a wireless communications network. In another example, one or both of interfaces 407, 409 can include cellular or mobile phone communications transceivers. In one embodiment, communications interface 407 is a power line communications interface and BMS interface 409 is an Ethernet interface. In other embodiments, both communications interface 407 and BMS interface 409 are Ethernet interfaces or are the same Ethernet interface.

Still referring to FIG. 4, BMS controller 366 is shown to include a processing circuit 404 including a processor 406 and memory 408. Processing circuit 404 can be communicably connected to BMS interface 409 and/or communications interface 407 such that processing circuit 404 and the various components thereof can send and receive data via interfaces 407, 409. Processor 406 can be implemented as a general purpose processor, an application specific integrated circuit (ASIC), one or more field programmable gate arrays (FPGAs), a group of processing components, or other suitable electronic processing components.

Memory 408 (e.g., memory, memory unit, storage device, etc.) can include one or more devices (e.g., RAM, ROM, Flash memory, hard disk storage, etc.) for storing data and/or computer code for completing or facilitating the various processes, layers and modules described in the present application. Memory 408 can be or include volatile memory or non-volatile memory. Memory 408 can include database components, object code components, script components, or any other type of information structure for supporting the various activities and information structures described in the present application. According to some embodiments, memory 408 is communicably connected to processor 406 via processing circuit 404 and includes computer code for executing (e.g., by processing circuit 404 and/or processor 406) one or more processes described herein.

In some embodiments, BMS controller 366 is implemented within a single computer (e.g., one server, one housing, etc.). In various other embodiments BMS controller 366 can be distributed across multiple servers or computers (e.g., that can exist in distributed locations). Further, while FIG. 4 shows applications 422 and 426 as existing outside of BMS controller 366, in some embodiments, applications 422 and 426 can be hosted within BMS controller 366 (e.g., within memory 408).

Still referring to FIG. 4, memory 408 is shown to include an enterprise integration layer 410, an automated measurement and validation (AM&V) layer 412, a demand response (DR) layer 414, a fault detection and diagnostics (FDD) layer 416, an integrated control layer 418, and a building subsystem integration later 420. Layers 410-420 can be configured to receive inputs from building subsystems 428 and other data sources, determine optimal control actions for building subsystems 428 based on the inputs, generate control signals based on the optimal control actions, and provide the generated control signals to building subsystems 428. The following paragraphs describe some of the general functions performed by each of layers 410-420 in BMS 400.

Enterprise integration layer 410 can be configured to serve clients or local applications with information and services to support a variety of enterprise-level applications. For example, enterprise control applications 426 can be configured to provide subsystem-spanning control to a graphical user interface (GUI) or to any number of enterprise-level business applications (e.g., accounting systems, user identification systems, etc.). Enterprise control applications 426 may also or alternatively be configured to provide configuration GUIs for configuring BMS controller 366. In yet other embodiments, enterprise control applications 426 can work with layers 410-420 to optimize building performance (e.g., efficiency, energy use, comfort, or safety) based on inputs received at interface 407 and/or BMS interface 409.

Building subsystem integration layer 420 can be configured to manage communications between BMS controller 366 and building subsystems 428. For example, building subsystem integration layer 420 may receive sensor data and input signals from building subsystems 428 and provide output data and control signals to building subsystems 428. Building subsystem integration layer 420 may also be configured to manage communications between building subsystems 428. Building subsystem integration layer 420 translate communications (e.g., sensor data, input signals, output signals, etc.) across a plurality of multi-vendor/multi-protocol systems.

Demand response layer 414 can be configured to optimize resource usage (e.g., electricity use, natural gas use, water use, etc.) and/or the monetary cost of such resource usage in response to satisfy the demand of building 10. The optimization can be based on time-of-use prices, curtailment signals, energy availability, or other data received from utility providers, distributed energy generation systems 424, from energy storage 427 (e.g., hot TES 242, cold TES 244, etc.), or from other sources. Demand response layer 414 may receive inputs from other layers of BMS controller 366 (e.g., building subsystem integration layer 420, integrated control layer 418, etc.). The inputs received from other layers can include environmental or sensor inputs such as temperature, carbon dioxide levels, relative humidity levels, air quality sensor outputs, occupancy sensor outputs, room schedules, and the like. The inputs may also include inputs such as electrical use (e.g., expressed in kWh), thermal load measurements, pricing information, projected pricing, smoothed pricing, curtailment signals from utilities, and the like.

According to some embodiments, demand response layer 414 includes control logic for responding to the data and signals it receives. These responses can include communicating with the control algorithms in integrated control layer 418, changing control strategies, changing setpoints, or activating/deactivating building equipment or subsystems in a controlled manner. Demand response layer 414 may also include control logic configured to determine when to utilize stored energy. For example, demand response layer 414 may determine to begin using energy from energy storage 427 just prior to the beginning of a peak use hour.

In some embodiments, demand response layer 414 includes a control module configured to actively initiate control actions (e.g., automatically changing setpoints) which minimize energy costs based on one or more inputs representative of or based on demand (e.g., price, a curtailment signal, a demand level, etc.). In some embodiments, demand response layer 414 uses equipment models to determine an optimal set of control actions. The equipment models can include, for example, thermodynamic models describing the inputs, outputs, and/or functions performed by various sets of building equipment. Equipment models may represent collections of building equipment (e.g., subplants, chiller arrays, etc.) or individual devices (e.g., individual chillers, heaters, pumps, etc.).

Demand response layer 414 may further include or draw upon one or more demand response policy definitions (e.g., databases, XML, files, etc.). The policy definitions can be edited or adjusted by a user (e.g., via a graphical user interface) so that the control actions initiated in response to demand inputs can be tailored for the user's application, desired comfort level, particular building equipment, or based on other concerns. For example, the demand response policy definitions can specify which equipment can be turned on or off in response to particular demand inputs, how long a system or piece of equipment should be turned off, what setpoints can be changed, what the allowable set point adjustment range is, how long to hold a high demand setpoint before returning to a normally scheduled setpoint, how close to approach capacity limits, which equipment modes to utilize, the energy transfer rates (e.g., the maximum rate, an alarm rate, other rate boundary information, etc.) into and out of energy storage devices (e.g., thermal storage tanks, battery banks, etc.), and when to dispatch on-site generation of energy (e.g., via fuel cells, a motor generator set, etc.).

Integrated control layer 418 can be configured to use the data input or output of building subsystem integration layer 420 and/or demand response later 414 to make control decisions. Due to the subsystem integration provided by building subsystem integration layer 420, integrated control layer 418 can integrate control activities of the subsystems 428 such that the subsystems 428 behave as a single integrated supersystem. In some embodiments, integrated control layer 418 includes control logic that uses inputs and outputs from a plurality of building subsystems to provide greater comfort and energy savings relative to the comfort and energy savings that separate subsystems could provide alone. For example, integrated control layer 418 can be configured to use an input from a first subsystem to make an energy-saving control decision for a second subsystem. Results of these decisions can be communicated back to building subsystem integration layer 420.

Integrated control layer 418 is shown to be logically below demand response layer 414. Integrated control layer 418 can be configured to enhance the effectiveness of demand response layer 414 by enabling building subsystems 428 and their respective control loops to be controlled in coordination with demand response layer 414. This configuration may advantageously reduce disruptive demand response behavior relative to conventional systems. For example, integrated control layer 418 can be configured to assure that a demand response-driven upward adjustment to the setpoint for chilled water temperature (or another component that directly or indirectly affects temperature) does not result in an increase in fan energy (or other energy used to cool a space) that would result in greater total building energy use than was saved at the chiller.

Integrated control layer 418 can be configured to provide feedback to demand response layer 414 so that demand response layer 414 checks that constraints (e.g., temperature, lighting levels, etc.) are properly maintained even while demanded load shedding is in progress. The constraints may also include setpoint or sensed boundaries relating to safety, equipment operating limits and performance, comfort, fire codes, electrical codes, energy codes, and the like. Integrated control layer 418 is also logically below fault detection and diagnostics layer 416 and automated measurement and validation layer 412. Integrated control layer 418 can be configured to provide calculated inputs (e.g., aggregations) to these higher levels based on outputs from more than one building subsystem.

Automated measurement and validation (AM&V) layer 412 can be configured to verify that control strategies commanded by integrated control layer 418 or demand response layer 414 are working properly (e.g., using data aggregated by AM&V layer 412, integrated control layer 418, building subsystem integration layer 420, FDD layer 416, or otherwise). The calculations made by AM&V layer 412 can be based on building system energy models and/or equipment models for individual BMS devices or subsystems. For example, AM&V layer 412 may compare a model-predicted output with an actual output from building subsystems 428 to determine an accuracy of the model.

Fault detection and diagnostics (FDD) layer 416 can be configured to provide on-going fault detection for building subsystems 428, building subsystem devices (i.e., building equipment), and control algorithms used by demand response layer 414 and integrated control layer 418. FDD layer 416 may receive data inputs from integrated control layer 418, directly from one or more building subsystems or devices, or from another data source. FDD layer 416 may automatically diagnose and respond to detected faults. The responses to detected or diagnosed faults can include providing an alert message to a user, a maintenance scheduling system, or a control algorithm configured to attempt to repair the fault or to work-around the fault.

FDD layer 416 can be configured to output a specific identification of the faulty component or cause of the fault (e.g., loose damper linkage) using detailed subsystem inputs available at building subsystem integration layer 420. In other exemplary embodiments, FDD layer 416 is configured to provide "fault" events to integrated control layer 418 which executes control strategies and policies in response to the received fault events. According to some embodiments, FDD layer 416 (or a policy executed by an integrated control engine or business rules engine) may shut-down systems or direct control activities around faulty devices or systems to reduce energy waste, extend equipment life, or assure proper control response.

FDD layer 416 can be configured to store or access a variety of different system data stores (or data points for live data). FDD layer 416 may use some content of the data stores to identify faults at the equipment level (e.g., specific chiller, specific AHU, specific terminal unit, etc.) and other content to identify faults at component or subsystem levels. For example, building subsystems 428 may generate temporal (i.e., time-series) data indicating the performance of BMS 400 and the various components thereof. The data generated by building subsystems 428 can include measured or calculated values that exhibit statistical characteristics and provide information about how the corresponding system or process (e.g., a temperature control process, a flow control process, etc.) is performing in terms of error from its setpoint. These processes can be examined by FDD layer 416 to expose when the system begins to degrade in performance and alert a user to repair the fault before it becomes more severe.

Referring now to FIG. 5, a block diagram of another building management system (BMS) 500 is shown, according to some embodiments. BMS 500 can be used to monitor and control the devices of HVAC system 100, waterside system 200, airside system 300, building subsystems 428, as well as other types of BMS devices (e.g., lighting equipment, security equipment, etc.) and/or HVAC equipment.

BMS 500 provides a system architecture that facilitates automatic equipment discovery and equipment model distribution. Equipment discovery can occur on multiple levels of BMS 500 across multiple different communications busses (e.g., a system bus 554, zone buses 556-560 and 564, sensor/actuator bus 566, etc.) and across multiple different communications protocols. In some embodiments, equipment discovery is accomplished using active node tables, which provide status information for devices connected to each communications bus. For example, each communications bus can be monitored for new devices by monitoring the corresponding active node table for new nodes. When a new device is detected, BMS 500 can begin interacting with the new device (e.g., sending control signals, using data from the device) without user interaction.

Some devices in BMS 500 present themselves to the network using equipment models. An equipment model defines equipment object attributes, view definitions, schedules, trends, and the associated BACnet value objects (e.g., analog value, binary value, multistate value, etc.) that are used for integration with other systems. Some devices in BMS 500 store their own equipment models. Other devices in BMS 500 have equipment models stored externally (e.g., within other devices). For example, a zone coordinator 508 can store the equipment model for a bypass damper 528. In some embodiments, zone coordinator 508 automatically creates the equipment model for bypass damper 528 or other devices on zone bus 558. Other zone coordinators can also create equipment models for devices connected to their zone busses. The equipment model for a device can be created automatically based on the types of data points exposed by the device on the zone bus, device type, and/or other device attributes. Several examples of automatic equipment discovery and equipment model distribution are discussed in greater detail below.

Still referring to FIG. 5, BMS 500 is shown to include a system manager 502; several zone coordinators 506, 508, 510 and 518; and several zone controllers 524, 530, 532, 536, 548, and 550. System manager 502 can monitor data points in BMS 500 and report monitored variables to various monitoring and/or control applications. System manager 502 can communicate with client devices 504 (e.g., user devices, desktop computers, laptop computers, mobile devices, etc.) via a data communications link 574 (e.g., BACnet IP, Ethernet, wired or wireless communications, etc.). System manager 502 can provide a user interface to client devices 504 via data communications link 574. The user interface may allow users to monitor and/or control BMS 500 via client devices 504.

In some embodiments, system manager 502 is connected with zone coordinators 506-510 and 518 via a system bus 554. System manager 502 can be configured to communicate with zone coordinators 506-510 and 518 via system bus 554 using a master-slave token passing (MSTP) protocol or any other communications protocol. System bus 554 can also connect system manager 502 with other devices such as a constant volume (CV) rooftop unit (RTU) 512, an input/output module (IOM) 514, a thermostat controller 516 (e.g., a TEC5000 series thermostat controller), and a network automation engine (NAE) or third-party controller 520. RTU 512 can be configured to communicate directly with system manager 502 and can be connected directly to system bus 554. Other RTUs can communicate with system manager 502 via an intermediate device. For example, a wired input 562 can connect a third-party RTU 542 to thermostat controller 516, which connects to system bus 554.

System manager 502 can provide a user interface for any device containing an equipment model. Devices such as zone coordinators 506-510 and 518 and thermostat controller 516 can provide their equipment models to system manager 502 via system bus 554. In some embodiments, system manager 502 automatically creates equipment models for connected devices that do not contain an equipment model (e.g., IOM 514, third party controller 520, etc.). For example, system manager 502 can create an equipment model for any device that responds to a device tree request. The equipment models created by system manager 502 can be stored within system manager 502. System manager 502 can then provide a user interface for devices that do not contain their own equipment models using the equipment models created by system manager 502. In some embodiments, system manager 502 stores a view definition for each type of equipment connected via system bus 554 and uses the stored view definition to generate a user interface for the equipment.

Each zone coordinator 506-510 and 518 can be connected with one or more of zone controllers 524, 530-532, 536, and 548-550 via zone buses 556, 558, 560, and 564. Zone coordinators 506-510 and 518 can communicate with zone controllers 524, 530-532, 536, and 548-550 via zone busses 556-560 and 564 using a MSTP protocol or any other communications protocol. Zone busses 556-560 and 564 can also connect zone coordinators 506-510 and 518 with other types of devices such as variable air volume (VAV) RTUs 522 and 540, changeover bypass (COBP) RTUs 526 and 552, bypass dampers 528 and 546, and PEAK controllers 534 and 544.

Zone coordinators 506-510 and 518 can be configured to monitor and command various zoning systems. In some embodiments, each zone coordinator 506-510 and 518 monitors and commands a separate zoning system and is connected to the zoning system via a separate zone bus. For example, zone coordinator 506 can be connected to VAV RTU 522 and zone controller 524 via zone bus 556. Zone coordinator 508 can be connected to COBP RTU 526, bypass damper 528, COBP zone controller 530, and VAV zone controller 532 via zone bus 558. Zone coordinator 510 can be connected to PEAK controller 534 and VAV zone controller 536 via zone bus 560. Zone coordinator 518 can be connected to PEAK controller 544, bypass damper 546, COBP zone controller 548, and VAV zone controller 550 via zone bus 564.

A single model of zone coordinators 506-510 and 518 can be configured to handle multiple different types of zoning systems (e.g., a VAV zoning system, a COBP zoning system, etc.). Each zoning system can include a RTU, one or more zone controllers, and/or a bypass damper. For example, zone coordinators 506 and 510 are shown as Verasys VAV engines (VVEs) connected to VAV RTUs 522 and 540, respectively. Zone coordinator 506 is connected directly to VAV RTU 522 via zone bus 556, whereas zone coordinator 510 is connected to a third-party VAV RTU 540 via a wired input 568 provided to PEAK controller 534. Zone coordinators 508 and 518 are shown as Verasys COBP engines (VCEs) connected to COBP RTUs 526 and 552, respectively. Zone coordinator 508 is connected directly to COBP RTU 526 via zone bus 558, whereas zone coordinator 518 is connected to a third-party COBP RTU 552 via a wired input 570 provided to PEAK controller 544.

Zone controllers 524, 530-532, 536, and 548-550 can communicate with individual BMS devices (e.g., sensors, actuators, etc.) via sensor/actuator (SA) busses. For example, VAV zone controller 536 is shown connected to networked sensors 538 via SA bus 566. Zone controller 536 can communicate with networked sensors 538 using a MSTP protocol or any other communications protocol. Although only one SA bus 566 is shown in FIG. 5, it should be understood that each zone controller 524, 530-532, 536, and 548-550 can be connected to a different SA bus. Each SA bus can connect a zone controller with various sensors (e.g., temperature sensors, humidity sensors, pressure sensors, light sensors, occupancy sensors, etc.), actuators (e.g., damper actuators, valve actuators, etc.) and/or other types of controllable equipment (e.g., chillers, heaters, fans, pumps, etc.).

Each zone controller 524, 530-532, 536, and 548-550 can be configured to monitor and control a different building zone. Zone controllers 524, 530-532, 536, and 548-550 can use the inputs and outputs provided via their SA busses to monitor and control various building zones. For example, a zone controller 536 can use a temperature input received from networked sensors 538 via SA bus 566 (e.g., a measured temperature of a building zone) as feedback in a temperature control algorithm. Zone controllers 524, 530-532, 536, and 548-550 can use various types of control algorithms (e.g., state-based algorithms, extremum seeking control (ESC) algorithms, proportional-integral (PI) control algorithms, proportional-integral-derivative (PID) control algorithms, model predictive control (MPC) algorithms, feedback control algorithms, etc.) to control a variable state or condition (e.g., temperature, humidity, airflow, lighting, etc.) in or around building 10.

BMS with Dynamic Point List

Figure 6:
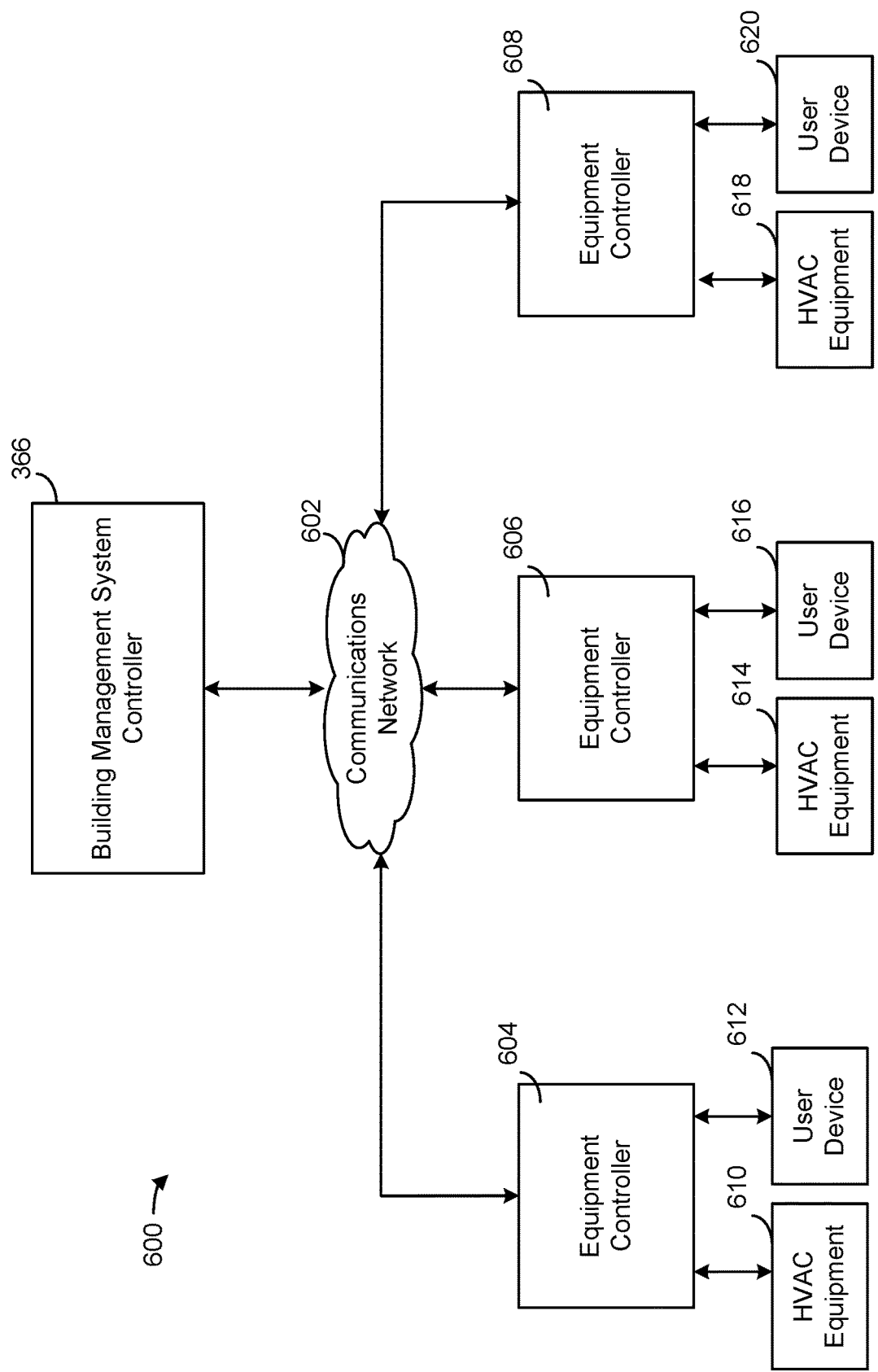
FIG. 6 is a block diagram of a building management system configured to generate and implement a dynamic point list, according to an exemplary embodiment.

Referring now to FIG. 6, a building management system 600 configured to generate and implement a dynamic point list is shown, according to an exemplary embodiment. System 600 is shown to include a BMS controller 366, equipment controllers 604, 606, 608, and a communications network 602. Although FIG. 6 shows three equipment controllers 604, 606, 608, a greater or lesser number of controllers may be present in various implementations.

In some embodiments, BMS controller 366 can communicate with one or more equipment controllers 604, 606, 608. Each equipment controller 604-608 may correspond to one or more devices of HVAC equipment 610, 612, 614 within HVAC system 100. For example, each equipment controller 604-608 can be connected to one or more devices of HVAC equipment 610, 614, 618 and may be configured to control the connected HVAC equipment 610, 614, 618.

To facilitate communications, communications network 602 can be provided between BMS controller 366 and equipment controllers 604, 606, 608. In some embodiments, equipment controllers 604, 606, 608 transmit information to BMS controller 366 via control signals sent through communications network 602. Transmitted information may include measurement data relating to temperature, carbon dioxide levels, relative humidity levels, air quality, occupancy, room schedules, electrical use, etc. In some embodiments, equipment controllers 604, 606, 608 receive information via control signals sent through communications network 602 from BMS controller 366. Received information may include valve or actuator positions, operating statuses, diagnostic information, etc.

Data communication through communications network 602 may be implemented via a direct connection (e.g., a wired connection, an ad-hoc wireless connection, etc.) or a network connection (e.g., an Internet connection, a LAN, WAN, or WLAN connection, etc.). In some embodiments, communications network 602 may use the Building Automation and Control networks (BACnet) communications protocol to send and receive data between BMS controller 366 and equipment controllers 604, 606, 608. The BACnet protocol defines a number of services that are used to communicate between BMS devices. BACnet services may for example include device and object discovery services (e.g., "Who-Is," "I-Am," "Who-Has," "I-Have," etc.) for identifying and mapping BMS devices.

As shown in FIG. 6, HVAC equipment 610 and user device 612 may provide information to equipment controller 604 which can subsequently be transmitted to BMS controller 366 via communications network 602. HVAC equipment 610 can be an AHU, actuator, chiller, boiler, or any other equipment described in FIGS. 1-3. In some embodiments, user device 612 receives information from a user through a user interface (e.g. graphical user interfaces, reporting interfaces, text-based computer interfaces, client-facing web services, web servers that provide pages to web clients, etc.) capable of controlling, viewing, or otherwise interacting with equipment controller 604. User device 612 can be a computer workstation, a client terminal, a remote or local interface, or any other type of stationary or mobile device with a suitable user interface. Equipment controllers 606, 608 can be configured to perform similar functions using associated HVAC equipment 614, 618 and user device 616, 620.

Figure 7:
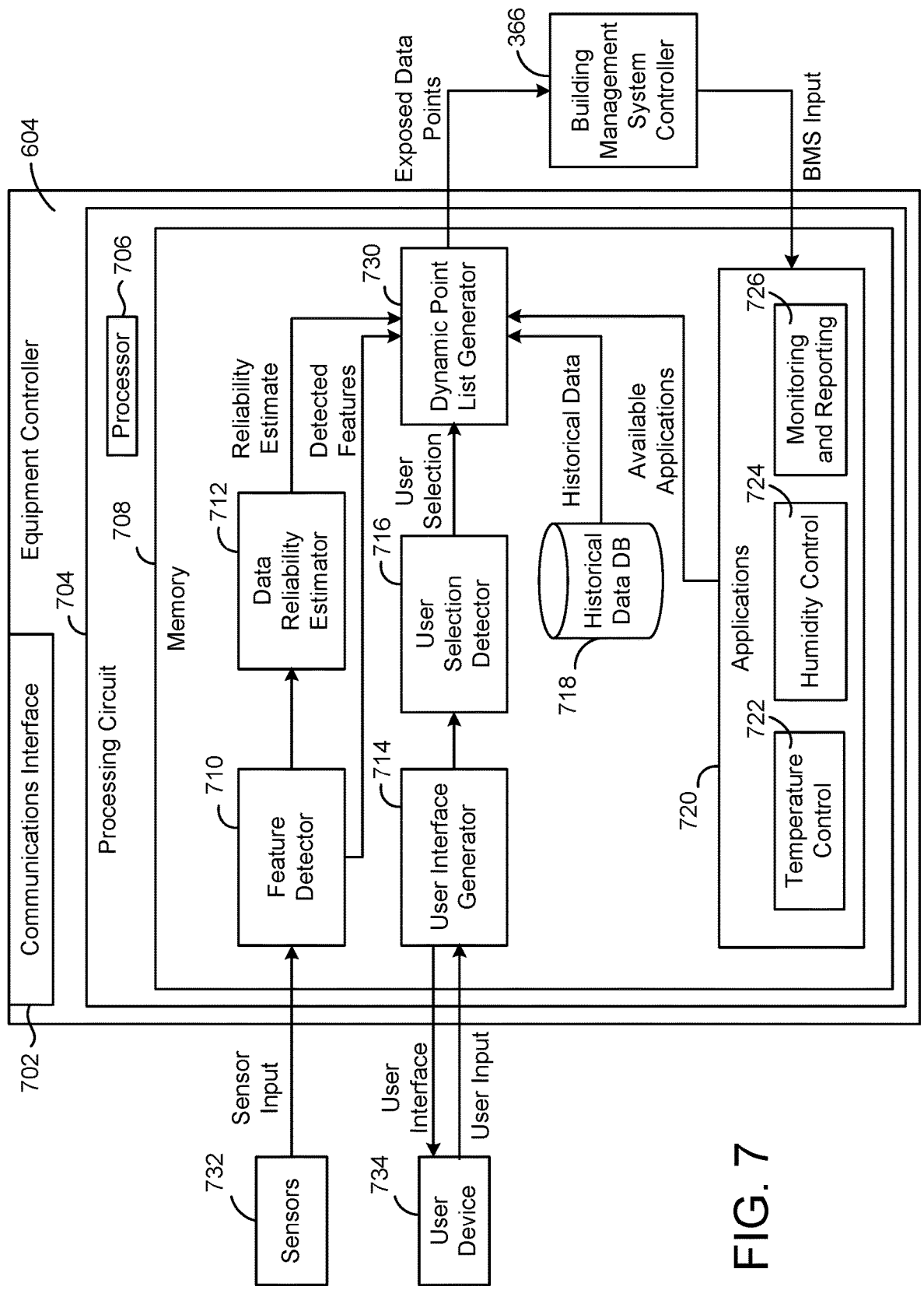
FIG. 7 is a block diagram illustrating one of the equipment controllers of FIG. 6 in greater detail, according to an exemplary embodiment.

Referring now to FIG. 7, equipment controller 604 is shown in further detail to illustrate implementation of the dynamic point list, according to some embodiments. Equipment controller 604 is shown to include a processing circuit 704. Processing circuit 704 includes a processor 706 and memory 708. Processor 706 can be a general purpose or specific purpose processor, an application specific integrated circuit (ASIC), one or more field programmable gate arrays (FPGAs), a group of processing components, or other suitable processing components. Processor 706 is configured to execute computer code or instructions stored in memory 708 or received from other computer readable media (e.g., CD-ROM, network storage, a remote server, etc.).

Memory 708 can include random access memory (RAM), read-only memory (ROM), hard drive storage, temporary storage, non-volatile memory, flash memory, optical memory, or any other suitable memory for storing software objects and/or computer instructions. Memory 708 can include database components, object code components, script components, or any other type of information structure for supporting the various activities and information structures described in the present disclosure. Memory 708 can be communicably connected to processor 706 via processing circuit 704 and can include computer code for executing (e.g., by processor 706) one or more processes described herein. When processor 706 executes instructions stored in memory 708 for completing the various activities described herein, processor 706 generally configures equipment controller 604 (and more particularly processing circuit 704) to complete such activities.

Memory 708 is shown to include a feature detector 710, a data reliability estimator 712, a user interface generator 714, and a user selection detector 716. Feature detector 710 can be configured to receive sensor input data from one or more sensors 732. In some embodiments, sensors 732 transmit sensor input to feature detector 710 using control signaling via communications interface 702 or through an independent connection.

In some embodiments, sensors 732 are configured to take measurements of HVAC equipment 610. Sensors 732 may include a temperature sensor, humidity sensor, flow-rate sensor, or any input device described in FIGS. 1-6. In some embodiments, sensors 732 may provide diagnostic data of HVAC equipment 610, such as equipment on/off states, equipment operating capacities, and any other diagnostic data that may be provided to equipment controller 604.

Feature detector 710 can be configured to receive sensor input from sensors 732. Feature detector 710 can use the sensor data to determine available features employed within HVAC equipment 610. In some embodiments, feature detector 710 is further configured to determine unavailable features employed within HVAC equipment 610. Feature detector 710 can pass determinations to data reliability estimator 712 and to dynamic point list generator 730 (described below).

For example, HVAC equipment 610 may include a fluid valve configured according to one of two possible variations. The first variation may employ an integral sensor to measure flow rate and another integral sensor to measure fluid temperature. The second variation may only employ an integral sensor to measure flow rate. In the first configuration, feature detector 710 detects sensor input containing both flow rate data and temperature data, and determines that both a flow rate sensor and temperature sensor are provided features. In the second configuration, feature detector 710 only detects sensor input containing flow rate data, and therefore determines that a flow rate sensor is installed and a temperature sensor is not installed.

In some embodiments, feature detector 710 passes its determination regarding available features to data reliability estimator 712 or to dynamic point list generator 730. In this situation, dynamic point list generator 730 determines unavailable features.

In some embodiments, feature detector 710 passes data to data reliability estimator 712. Data reliability estimator 712 may determine that received data is unreliable using any suitable method, such as comparing confidence, standard deviation, direct measurements, etc. to a predetermined threshold. For example, data reliability estimator 712 may calculate a degree of confidence based on comparison of received data to expected results. In an example embodiment, data reliability estimator 712 may compare current data to data stored in a historical data 718 database.

Data reliability estimator 712 may then take one of a set of steps. For example, if data reliability estimator 712 determines received data to be sufficiently unreliable, it may flag the corresponding data to facilitate responsive action by the dynamic point list generator 730, BMS controller 366, or other downstream processing. In some embodiments, data reliability estimator 712 seeks additional measurement data. In some embodiments (not shown), data reliability estimator 712 is not provided, and feature detector 710 will send data received from sensors 732 directly to dynamic point list generator 730.

Memory 708 is shown to include historical data database 718. In some embodiments, historical data database 718 may be used to actively assist dynamic point list generator 730. Historical data database 718 may be configured to store any type of information to assist the object of embodiments in the present disclosure. For example, historical data database 718 can store calendar information, weather information, on/off states, fault detections, time-logs of measurement data, historical user input or sensor input information, etc. In some embodiments, historical data database 718 is not provided.

In some embodiments, dynamic point list generator 730 may cross-reference historical data from database 718 against real-time data to assist reliability determinations made by data reliability estimator 712. For example, dynamic point list generator 730 may use a system of rules to validate determinations by data reliability estimator 712 by comparing current or real-time data to past data stored in historical data 718 database.

In some embodiments, historical data 718 may be used for error-checking. For example, dynamic point list generator 30 may compare determinations made by feature detector 710 and user selection detector 716 to previous determinations stored in historical data 718 database. As another example, dynamic point list generator 730 may override a user selection detector 716 determination based on comparison to data retrieved from historical data 718 database.

Memory 708 is shown to include a user interface generator 714 configured to generate a user interface (e.g., graphical user interfaces, reporting interfaces, text-based computer interfaces, client-facing web services, web servers that provide pages to web clients, etc.) for controlling, viewing, or otherwise interacting with equipment controller 604 and associated HVAC equipment 610 using input commands to the user device 734. User device 734 can be a computer workstation, a client terminal, a remote or local interface, or any device capable of supporting a user interface.

In some embodiments, the user device 734 allows a user to select various applications of HVAC equipment 610. In some embodiments, user interface on user device 734 employs a graphical user interface to display a set of installed features or applications provided with HVAC equipment 610. For example, referring to the aforementioned example of a fluid valve capable of measuring flow rate and temperature, a user may require the fluid valve be configured for an application of measuring flow rate of fluid travelling through the fluid valve. In this situation, the user can interact with the graphical user interface to set the flow rate application of the fluid valve by providing user input to the user interface generator 714. User interface generator 714 is configured to subsequently pass the user input to the user selection detector 716.

User selection detector 716 is generally configured to receive user input, detect user-selected applications based on the user input, and determine the selected applications in particular. In some embodiments, user selection detector 716 is further configured to determine unselected applications by comparing selected applications to a master list of available applications. User selection detector 716 can pass determinations regarding both selected applications and unselected applications to dynamic point list generator 730 (described below). In some embodiments, feature detector 710 only passes its determination regarding selected applications to dynamic point list generator 730. In this situation, dynamic point list generator 730 can be configured to determine unselected applications.

Still referring to FIG. 7, memory 708 is shown to include applications module 720. In some embodiments, applications module 720 may perform a similar function as user selection detector 716. However, applications module 720 is generally configured to receive BMS input from BMS controller 366 rather than receive input from a user device 734. In some embodiments, applications module 720 may be selected based on operational or performance feedback within HVAC system 100. For example, BMS controller 366 can dynamically update applications module 720 such that the associated HVAC equipment 610 commences a temperature control application 722 and terminates a humidity control application 724. In this situation, the dynamic point list generator 730 can refresh the dynamic point list such that it includes data points associated with the temperature measurement application and no longer includes data points associated with humidity measurements.

It should be noted that applications module 720 may include any suitable application or combination of applications. Thus, temperature control application 722, humidity control application 724, and monitoring and reporting application 726 are not intended to be an exhaustive list of possible applications that may be provided in various embodiments. Rather, it is contemplated that applications module 720 can include any of a variety of applications that may advantageously assist dynamic point list generator's 730 objective of reducing irrelevant data points exposed to the BMS controller 366. For example, the type and combination of applications may vary based on user selections manually provided to BMS controller 366 via a user interface, feedback automatically generated by BMS controller 366, artificial intelligence algorithms, etc.

In some embodiments, applications module 720 is generally configured to determine selected applications based on BMS input received by BMS controller 366. In some embodiments, applications module 720 is further configured to determine unselected applications by comparing selected applications to a master list of available applications. In some embodiments, unselected applications can be determined by BMS input received by BMS controller 366. Applications module 720 can pass determinations regarding both selected applications and unselected applications to dynamic point list generator 730 (described below). In some embodiments, applications module 720 only passes its determination regarding selected applications to dynamic point list generator 730. In this situation, dynamic point list generator 730 determines unselected applications.

Still referring to FIG. 7, memory is shown to include dynamic point list generator 730. Dynamic point list generator 730 is generally configured to reduce data points exposed to the BMS when a new equipment is added to the HVAC system. As discussed in FIG. 5, BMS architecture can facilitate automatic equipment discovery and automatic mapping of data points when a new equipment is added to the HVAC system. This architecture involves mapping of a complete data point list, even though some data points may be irrelevant. In particular, irrelevant data points may include data points associated with features not provided with an HVAC equipment 610 or data points associated with applications not selected by the user device or BMS controller.

Dynamic point list generator 730 can provide BMS controller 366 with a dynamic point list. The dynamic point list generally represents a subset of the complete data point list. Only data points that are determined to be relevant are exposed to the BMS and thus those data points can be imported and mapped by the BMS. Data points that are not exposed to the BMS cannot be auto-discovered or mapped by the BMS.

Dynamic point list generator 730 is generally configured to generate the dynamic point list using input information, such as user input from user device 734 and sensor input from sensors 732. As described above, feature detector 710 can identify available features based on sensor input received from user device 734. Feature detector 710 may then provide a list of available features to the dynamic point list generator 730. Similarly, as described above, user selection detector 716 can identify selected applications based on user input received from user device 734. User selection detector may then provide a list of selected applications to the dynamic point list generator 730.

In some embodiments, dynamic point list generator 730 is configured to determine, based on the identified features received by feature detector 710, a list of unavailable features. For example, dynamic point list generator 730 may compare identified features to a list of potential features to determine unavailable features. Dynamic point list generator 730 can scan data points in a complete data point list to identify data points associated with unavailable features. If the dynamic point list generator 730 identifies data points associated with unavailable features, it can generate a dynamic point list by extracting all data points in the complete data point list and subsequently removing the identified data points from the extracted points.

In some embodiments, dynamic point list generator 730 is configured to determine, based on selected applications received by user selection detector 716, a list of unselected applications. For example, dynamic point list generator 730 may compare the selected applications to a list of potential applications to determine unselected applications. Dynamic point list generator 730 can scan data points in a complete data point list to identify data points associated with unselected applications. If the dynamic point list generator 730 identifies data points associated with unselected applications, it can generate a dynamic point list by extracting all data points in the complete data point list and subsequently removing the identified data points from the extracted points.

In some embodiments, the dynamic point list generator 730 generates the dynamic point list by identifying and extracting data points in a complete data point list directly associated with the available features. In this situation the dynamic point list generator 730 can bypass a determination of unavailable features. Similarly, the dynamic point list generator 730 can generate the dynamic point list by identifying and extracting data points in a complete data point list directly associated with the selected applications. In this situation the dynamic point list generator 730 can bypass a determination of unselected applications.

In some embodiments, dynamic point list generator 730 exposes the dynamic point list to BMS controller 366. Exposed data points generated by dynamic point list can dynamically change in real-time or based on schedule. In some embodiments, exposed data points generated by dynamic point list can dynamically change as new input information is received in memory 708.

Figure 8:
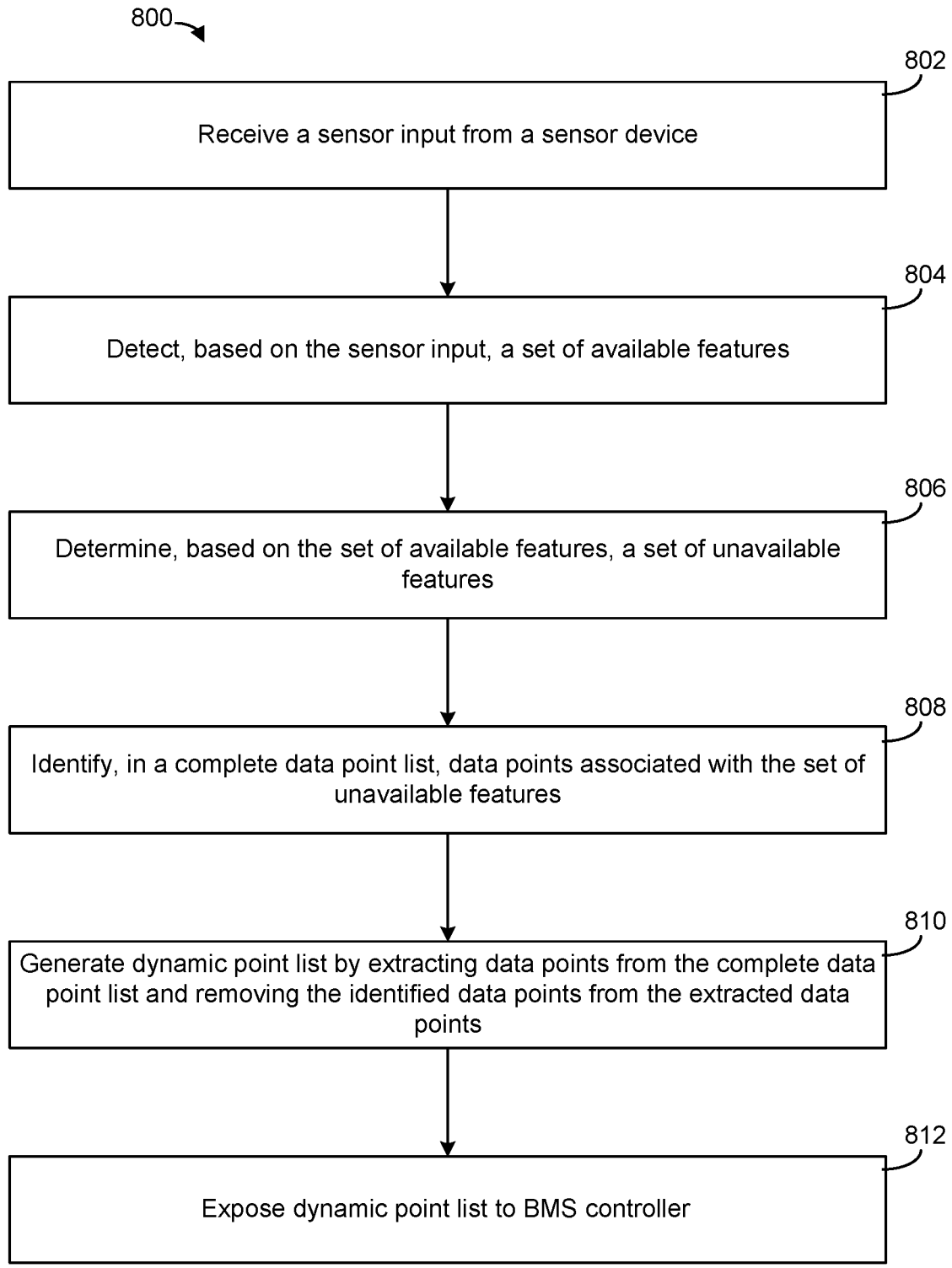
FIG. 8 is a flowchart of a process for generating and implementing a dynamic point list within a building management system based on sensor input, according to an exemplary embodiment.

Referring now to FIG. 8, a process 800 for generating a dynamic point list by an equipment controller is shown, according to an exemplary embodiment. FIG. 8 illustrates a process for generating the dynamic point list using sensor input information provided by sensors 732. In some embodiments, process 800 is performed by one or more components of equipment controller 604, 606, or 608. For example, process 800 can be performed by processing circuit 704 based on sensor input information in memory 708.

At step 802, feature detector 710 detects a sensor input from a sensor 732. The sensor input may vary based on the particular types and number of sensors 732 that provide input to equipment controller 604. For example, the sensor input may include temperature measurements if sensors 732 include temperature sensors, humidity measurements if sensors 732 include humidity sensors, and/or occupancy signals if sensors 732 include occupancy detectors.

Based on the sensor input, feature detector 710 can then determine a set of available features (step 804). Some features may require input from a particular type or types of sensor 732. For example, a temperature control feature may require input from a temperature sensor, whereas a humidity control feature may require input from a humidity sensor. Feature detector 710 can identify a set of potential features and determine if the required input is available for each potential feature. If all of the required sensor inputs for a feature are available, feature detector 710 may determine that the feature is available. Conversely, if one or more of the required sensor inputs for a feature are missing, feature detector 710 may determine that the feature is unavailable.

In some embodiments, step 804 includes determining a set of available features based on the type or types of HVAC equipment 610 connected to equipment controller 604. Some features may require a particular type of HVAC equipment 610 to operate properly. For example, a temperature control feature may require a type of HVAC equipment capable of affecting temperature (e.g., a chiller, a boiler, a fan, etc.), whereas a humidity control feature may require a type of HVAC equipment capable of affecting humidity (e.g., a humidifier, a dehumidifier, a fan, etc.). If all of the required types of HVAC equipment for a feature are available, feature detector 710 may determine that the feature is available. Conversely, if one of more of the required types of HVAC equipment for a feature are missing, feature detector 710 may determine that the feature is unavailable. Determinations made by feature detector 710 can be passed to data reliability estimator 712 and to dynamic point list generator 730.

At step 806, feature detector 710 determines a set unavailable features. In some embodiments, dynamic point list generator 730 determines whether features are unavailable based on a comparison of features determined to be available by feature detector 710. For example, dynamic point list generator 730 may compare features determined to be available to a list of potential features. In this situation, dynamic point list generator may remove the available features from the list of potential features. The resulting set of features can be inferred to be the set of unavailable features.

At step 808, dynamic point list generator 730 examines the complete data point list and identifies whether the complete data point list contains data points associated with unavailable features. If the complete data point list contains data points associated with features not present, dynamic point list generator 730 will not include those data points in the dynamic point list.

For example, a rooftop AHU with direct expansion cooling and gas-fired heating would have a dynamic point list containing data points corresponding to both heating data and cooling data. In this situation, sensor input provided by sensors 732 provide information to feature detector 710 enabling it to detect the presence of both features. Feature detector 710 can pass determinations to dynamic point list generator 730.

In contrast, a rooftop AHU with direct expansion cooling, but without gas-fired heating, would have a dynamic point list containing cooling data. In this situation, sensor input provided by sensors 732 provide information to feature detector 710 enabling it to detect the presence of the direct expansion cooling feature. The feature detector 710 can also detect that the gas-fired heating feature is not present. Dynamic point list generator 730 examines the complete data point list to see whether it contains data points corresponding to gas-fired heating (irrelevant data points).

At step 810, the dynamic point list generator 730 generates the dynamic point list by extracting all data points in the complete data point list and removing the identified data points from the extracted data points. Referring to the above example, in the first configuration, the dynamic point list generator 730 will include data points associated with both direct expansion cooling and gas-fired heating features when generating the dynamic point list. However, in the second configuration, the dynamic point list generator 730 will include data points associated with cooling data but will not include data points associated with heating when generating the dynamic point list.

At step 812, the dynamic point list generator 730 exposes or transmits the dynamic point list to the BMS controller 366. In some embodiments, only data points in the dynamic point list are exposed to the BMS and data points that have not been included points in the dynamic point list due to the foregoing are not exposed and cannot be auto-mapped.

Figure 9:
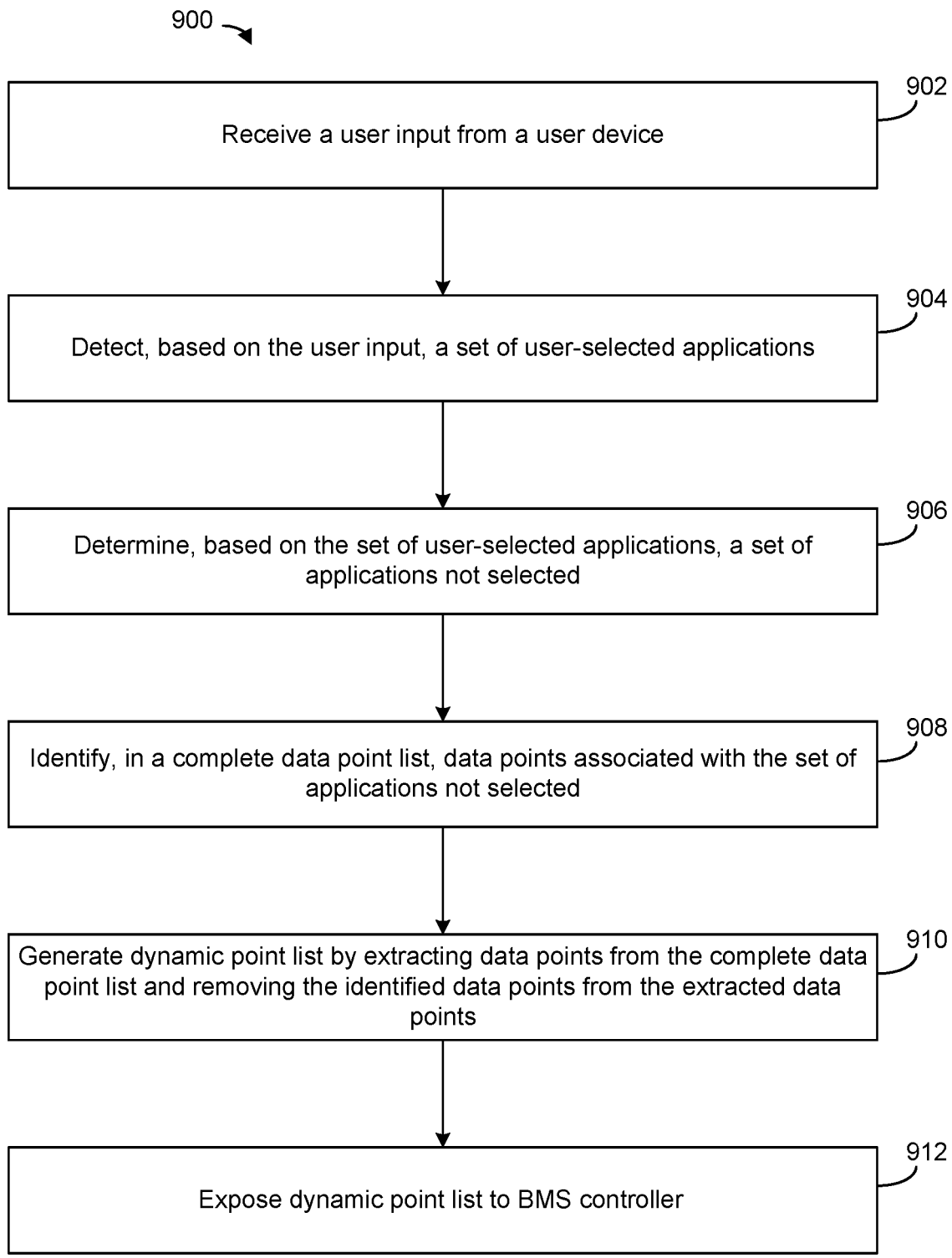
FIG. 9 is a flowchart of a process for generating and implementing a dynamic point list within a building management system based on user input, according to an exemplary embodiment.

Referring now to FIG. 9, a process 900 for generating a dynamic point list by an equipment controller is shown, according to an exemplary embodiment. FIG. 9 illustrates a process for generating the dynamic point list using information received from sensor 732. In some embodiments, process 900 is performed by one or more components of equipment controller 604, 606, or 608. For example, process 900 can be performed by processing circuit 704 based on user input information in memory 708. In some embodiments, process 900 may be implemented simultaneously or in tandem with the process illustrated in FIG. 8.

At step 902, user selection detector 716 receives a user input which is sent by a user device 734. In some embodiments, the user input is received via a user interface generated by a user interface generator 714. For example, user interface on user device 734 can employ a graphical user interface to display a set of installed features or applications provided with HVAC equipment 610. By interacting with the graphical user interface, the user can selectively choose one or more applications and provide the user input to the user selection detector 716.

At step 904, user selection detector 716 detects, based on the user input, user-selected applications. In some embodiments, user selection detector 716 analyzes user input information received by user device 734 and determines a set of user-selected applications. In some embodiments, step 904 includes determining user-selected applications based on the type or types of HVAC equipment 610 connected to equipment controller 604. Determinations made by user selection detector 716 can be passed to dynamic point list generator 730.

At step 906, user selection detector 716 determines, based on the set of user-selected applications, a set of applications not selected. In some embodiments, dynamic point list generator 730 determines, based on the set of user-selected applications, a set of applications not selected. In some embodiments, user selection detector 716 or dynamic point list generator 730 compares the selected applications to a list of potential applications to determine unselected applications. The list of potential applications can vary based on the type or of HVAC equipment 610 connected to equipment controller 604. Determinations made by user selection detector 716 can be passed to dynamic point list generator 730.

At step 908, dynamic point list generator 730 examines the complete data point list and identifies whether the complete data point list contains data points associated with the set of applications not selected. If the complete data point list contains data points associated with applications not selected, dynamic point list generator 730 will not include those data points in the dynamic point list. For example, a rooftop AHU selected as a variable air volume application may include data points associated with both duct static pressure and set point. If the complete data point list contains data points associated with both duct static pressure and set point, dynamic point list generator 730 will include these data points in dynamic point list. In contrast, if a user selects an application designating the rooftop AHU as a single zone application, the dynamic point list generator 730 will examine the complete data point list for data points associated with duct static pressure and set point. These data points will not be included in the dynamic point list because the associated data are not used in that application.

At step 910, the dynamic point list generator 730 generates the dynamic point list. In some embodiments, if the dynamic point list generator 730 identifies data points associated with unselected applications, it generates a dynamic point list by extracting all data points in the complete data point list and subsequently removing the identified data points from the extracted points.

At step 912, the dynamic point list generator 730 exposes or transmits the dynamic point list to the BMS controller 366. In some embodiments, only data points in the dynamic point list are exposed to the BMS controller 366 and data points that have not been included in the dynamic point list are not exposed to the BMS and cannot be auto-mapped.

As described in FIG. 7, applications module 720 which receives BMS input from BMS controller 366 may similarly instruct dynamic point list generator 730 of applications that have relevant data points. Dynamic point list generator 730 can generate the dynamic point list in a manner similar to the process 900 shown in FIG. 9. In some embodiments, dynamic point list generator 730 will identify whether the complete data point list contains data points associated with applications that are no longer required. Dynamic point list generator 730 may not include those data points in the dynamic point list. Data points associated with new applications may be identified by dynamic point list generator 730 and dynamically implemented in the dynamic point list.

Configuration of Exemplary Embodiments

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements can be reversed or otherwise varied and the nature or number of discrete elements or positions can be altered or varied. Accordingly, all such modifications are intended to be included within the scope of the present disclosure. The order or sequence of any process or method steps can be varied or re-sequenced according to alternative embodiments. Other substitutions, modifications, changes, and omissions can be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure can be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures show a specific order of method steps, the order of the steps may differ from what is depicted. Also two or more steps can be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. An equipment controller in a building management system (BMS), the equipment controller comprising:
   one or more circuits configured to:
     receive sensor input from a sensor;
     determine, based on the sensor input, a set of features available to the equipment controller;
     determine, based on the set of available features, a set of unavailable features;
     identify, in a complete point list, one or more points associated with the set of unavailable features;
     generate a dynamic point list by removing the one or more points associated with the set of unavailable features from the complete point list; and
     expose the dynamic point list to a BMS controller communicably connected to the equipment controller.

2. The equipment controller of claim 1, the one or more circuits further configured to:
   provide a user interface to a user device;
   receive user input from the user device via the user interface; and
   determine, based on the user input, a set of selected applications;
   determine, based on the set of selected applications, a set of unselected applications;
   identify, in the dynamic point list, one or more points associated with the set of unselected applications; and
   remove, from the dynamic point list, the identified points associated with the set of unselected applications.

3. The equipment controller of claim 1, the one or more circuits further configured to:
   receive the sensor input and calculate a reliability confidence level associated with the sensor input;
   determine whether the reliability confidence level exceeds a reliability threshold; and
   in response to a determination that the reliability confidence level exceeds the reliability threshold, identify one or more points associated with the sensor input and remove the identified points from the dynamic point list.

4. The equipment controller of claim 3, the one or more circuits further configured to:
   calculate the reliability confidence level by comparing the sensor input to historical data.

5. The equipment controller of claim 4, the one or more circuits further configured to:
   detect a second set of applications based on input from the BMS controller;
   determine, based on the second set of applications, a second set of unselected applications;
   identify, in the dynamic point list, one or more points associated with the second set of unselected applications; and
   remove, from the dynamic point list, the identified points associated with the second set of unselected applications.

6. The equipment controller of claim 1, the one or more circuits further configured to:
   receive a set of applications based on input from the BMS controller;
   determine, based on the set of applications, a set of unselected applications;
   identify, in the dynamic point list, one or more points associated with the set of unselected applications; and
   remove, from the dynamic point list, the identified points associated with the set of unselected applications.

7. A method for dynamically adjusting points exposed by an equipment controller in a building management system (BMS), the method comprising:
   receiving, at the equipment controller, a sensor input from a sensor;
   detecting, based on the sensor input, a set of features available to the equipment controller;
   determining, based on the set of available features, a set of unavailable features;
   identifying, in a complete point list, one or more points associated with the set of unavailable features;
   generating a dynamic point list by removing the one or more points associated with the set of unavailable features from the complete point list; and
   exposing the dynamic point list to a BMS controller in the BMS.

8. The method of claim 7, further comprising:
   receiving a user input from a user device;
   detecting, based on the user input, a set of selected applications;
   determining, based on the set of selected applications, a set of unselected applications;
   identifying, in the dynamic point list, one or more points associated with the set of unselected applications; and removing, from the dynamic point list, the one or more points associated with the set of unselected applications.

9. The method of claim 8, further comprising:
providing a user interface to the user device; and
receiving a selection, via the user interface, of a set of applications capable of being executed by the equipment controller.

10. The method of claim 7, further comprising:
calculating a reliability confidence level associated with the sensor input;
determining whether the reliability confidence level exceeds a reliability threshold; and
in response to a determination that the reliability confidence level exceeds the reliability threshold, identifying one or more points in the dynamic point list associated with the sensor input and removing the one or more points in the dynamic point list associated with the sensor input from the dynamic point list.

11. The method of claim 10, wherein calculating the reliability confidence level comprises comparing the sensor input to historical data.

12. The method of claim 11, further comprising:
receiving a BMS input from the BMS controller;
detecting, based on the BMS input, a second set of applications;
determining, based on the second set of applications, a second set of unselected applications;
identifying, in the dynamic point list, one or more points associated with the second set of unselected applications; and
removing, from the dynamic point list, the one or more points associated with the second set of unselected applications.

13. The method of claim 7, further comprising:
receiving a BMS input from the BMS controller;
detecting, based on the BMS input, a set of selected applications;
determining, based on the set of selected applications, a set of unselected applications;
identifying, in the dynamic point list, one or more points associated with the set of unselected applications; and
removing, from the dynamic point list, the one or more points associated with the set of unselected applications.

14. A method for dynamically adjusting points exposed by a controller in a building management system (BMS), the method comprising:
receiving, at the controller, a sensor input from a sensor;
detecting, based on the sensor input, a set of features available to the controller;
determining, based on the set of available features, a set of unavailable features;
identifying, in a complete point list, one or more points associated with the set of unavailable features;
generating a dynamic point list by removing the one or more points associated with the set of unavailable features from the complete point list; and
exposing the dynamic point list to the BMS.

15. The method of claim 14, further comprising:
receiving a user input from a user device;
detecting, based on the user input, a set of selected applications;
determining, based on the set of selected applications, a set of unselected applications;
identifying, in the dynamic point list, one or more points associated with the set of unselected applications; and
removing, from the dynamic point list, the one or more points associated with the set of unselected applications.

16. The method of claim 15, further comprising:
providing a user interface to the user device; and
receiving a selection, via the user interface, of a set of applications capable of being executed by the controller.

17. The method of claim 14, further comprising:
calculating a reliability confidence level associated with the sensor input;
determining whether the reliability confidence level exceeds a reliability threshold; and
in response to a determination that the reliability confidence level exceeds the reliability threshold, identifying one or more points in the dynamic point list associated with the sensor input and removing the one or more points in the dynamic point list associated with the sensor input from the dynamic point list.

18. The method of claim 17, wherein calculating the reliability confidence level comprises comparing the sensor input to historical data.

19. The method of claim 18, further comprising:
receiving a BMS input from the BMS;
detecting, based on the BMS input, a second set of applications;
determining, based on the second set of applications, a second set of unselected applications;
identifying, in the dynamic point list, one or more points associated with the second set of unselected applications; and
removing, from the dynamic point list, the one or more points associated with the second set of unselected applications.

20. The method of claim 14, further comprising:
receiving a BMS input from the BMS;
detecting, based on the BMS input, a set of selected applications;
determining, based on the set of selected applications, a set of unselected applications;
identifying, in the dynamic point list, one or more points associated with the set of unselected applications; and
removing, from the dynamic point list, the one or more points associated with the set of unselected applications.

* * * * *